United States Patent [19]
Tsukishima et al.

[11] Patent Number: 6,122,560
[45] Date of Patent: *Sep. 19, 2000

[54] METHOD AND DEVICE FOR COMPUTING MATERIAL REQUIREMENTS

[75] Inventors: Takahiro Tsukishima, Yokohama; Hideaki Matoba, Ebina; Mitsuhiro Enomoto, Fujisawa; Mitsuharu Hayakawa, Konosu; Masahiro Sato, Yokohama; Tetsushi Tomizawa, Urawa; Yoshinao Arai, Yokohama, all of Japan

[73] Assignee: Hitachi, Ltd., Tokyo, Japan

[ * ] Notice: This patent is subject to a terminal disclaimer.

[21] Appl. No.: 08/923,069

[22] Filed: Sep. 3, 1997

Related U.S. Application Data

[63] Continuation of application No. 08/610,811, Mar. 7, 1996, Pat. No. 5,764,519.

[30] Foreign Application Priority Data

Mar. 8, 1995 [JP] Japan ........................................ 7-48802
May 26, 1995 [JP] Japan ...................................... 7-127965

[51] Int. Cl.$^7$ .............................. G06F 17/60; G06F 19/00
[52] U.S. Cl. .............................. 700/106; 700/107; 705/29
[58] Field of Search ........................ 364/468.13, 468.14; 705/29; 700/106, 107

[56] References Cited

U.S. PATENT DOCUMENTS

| | | | |
|---|---|---|---|
| 4,847,761 | 7/1989 | Ferriter et al. ............................ | 700/29 |
| 4,924,385 | 5/1990 | Dote .......................................... | 364/300 |
| 5,204,821 | 4/1993 | Inui et al. ................................. | 700/106 |
| 5,295,067 | 3/1994 | Cho et al. ................................. | 705/29 |
| 5,307,261 | 4/1994 | Maki et al. ................................ | 705/29 |
| 5,321,605 | 6/1994 | Chapman et al. ........................... | 705/7 |
| 5,339,247 | 8/1994 | Kirihara et al. ......................... | 364/468 |
| 5,528,752 | 6/1996 | Kise et al. ........................... | 395/183.05 |
| 5,796,614 | 8/1998 | Yamada ............................... | 364/468.13 |

*Primary Examiner*—William Grant
*Assistant Examiner*—Iván Calcano
*Attorney, Agent, or Firm*—R. William Beard, Jr.; Frohwitter

[57] ABSTRACT

A method or device for computing material requirements which calculates various parts and materials necessary for products to be produced when a production plan is input, in order to reduce the processing time for a material requirements computation. In order to establish the object, the method or device of computing material requirements is provided, which can perform a parallel process without using conventional low level codes. Parts computing means are respectively assigned to items. When the lower parts computing means receives the computation result of the upper parts computing means, it independently executes the computing process if the computation result is sufficient for the parts computation. The process rate of the material requirements computation can be improved by performing the load distribution under a fixed rule, including that to which computer the data of an item is loaded or by which computer an item is processed, when the material requirements are computed in parallel process using plural computers.

20 Claims, 23 Drawing Sheets

NETWORK CONNECTION-TYPE

MESH CONNECTION-TYPE

CLOSELY-COUPLED PARALLEL COMPUTER

LOOSELY-COUPLED FILE SHARED-TYPE PARALLEL COMPUTER

DISTRIBUTED ENVIRONMENT (C) DISTRIBUTED ENVIRONMENT

DB DISTYIBUTED-TYPE

DB CENTRALIZED-TYPE

METHOD AND DEVICE FOR COMPUTING MATERIAL REQUIREMENTS

CONTINUATION INFORMATION

This application is a continuation of U.S. application Ser. No. 08/610,811, filed on Mar. 7, 1996 now U.S. Pat. No. 5,764,519.

BACKGROUND OF THE INVENTION

1. Field of the Invention

The present invention relates to a material requirements computing method which computes various parts and materials necessary for products to be produced when a production plan is input, and to a material requirements computing device.

2. Description of Related Art

In planning the manufacture of a product such as a motor, material requirements planning (hereinafter, referred to as MRP) is well-known as a method of automatically computing the types of parts and the number of parts necessary to manufacture products.

The material requirements computing method refers to the computing method for the MRP, and a material requirements computing device refers to the computing device for the MRP. Hereinafter, the material requirements computation is called "MRP computation".

The MRP and conventional MRP computing method is described, for example, in "ILLUSTRATION 500 MRP TERMS SELECTION" (published by Nikkan-Kogyo Newspaper Publishing Co. in 1983). The conventional MRP computing method will be briefly explained below.

In the MRP computation, an ordering plan, containing the necessary number and delivery time of necessary components which are either purchased or manufactured as constituents of the plan, such as parts and materials, is computed according to a master production schedule (hereinafter, referred to as MPS) for a prescribed production level. This computation roughly requires three items of information as follows:

(1) MPS

MPR generally represents a production plan for an item (product) at a top level in a parts expansion diagram. This may be called a master production schedule.

(2) Parts table

The parts table (or a bill of materials) represents a table listing two items of master data: data peculiar to items, called "item data (or parts list data)" and data called "product configuration data (or product structure data)" showing the relationship between items such as product and part, part and part, or part and material.

The item data includes, for example, the time (hereinafter referred to as "lead time") necessary to produce or purchase parts. For example, the information regarding child items needed to produce an item, or the number of child items needed for an item to be produced (called "number" of child items) can be obtained according to the product configuration data.

(3) Inventory and order backlog

This means the number of goods in stock or being processed at the current time for each item, or the delivery time of an ordered item and the predetermined number thereof (order backlog information).

In the MRP computation, the following five calculations are carried out for each item, based on the above-mentioned information.

(1) Total requirements computation

The total requirements are calculated on a term basis, by reading the requirements data of an item and then collecting the required amount during a term. Briefly, the daily planning will be explained below with the term set to one day.

(2) Net requirements computation

This refers to the calculation of the net requirements needed for a day by reserving the stock and order backlog based on the calculated total requirements.

(3) Lot sizing

Items are sized or collected in an amount suitable to the procedure, using the lot size set for an item, based on the net requirements calculated on day by day basis.

(4) Lead time computation

The order is prepared by subtracting a lead time from the delivery time of the collected lots and then calculating the order date and launch date.

(5) Requirements expansion

The prepared order is developed to the lower item by using the parts table. Specifically, the date before an order launch date is set as a request date. The requirements of each child item are computed based on the child item of product configuration data, as well as the number thereof, and then written in as the requirements data of each item.

Hereinafter, the computation including the items (1) to (5) is generically called as "expansion computation". The MRP computation relates to all products set by the MPS and is applied to the expansion computation of all the items needed in the product production.

In this case, care should be taken with respect to the timing when an expansion computation is performed for each item. For example, in the case of the product having the configuration shown in the parts expansion (developed) diagram in FIG. 2, the item CL corresponds to the child item of each of the items HC and RC. For that reason, the total requirements of the item CL is the sum of the requirements of the item HC and the requirements of the item RC. The expansion computation for the item CL must be made after the expansion computation has been completed for the items HC and RC.

In this example, the parts configuration is relatively simple because there is only one product. However, the computation must also be carried out for the complicated configuration including several hundreds or several thousands products, and several tens of thousands of items.

In the conventional MRP computation, the expansion computation for each item is controlled by introducing low level codes and using queues. The pointer called an activity chain is generally used instead of queues. However, this is substantially the same as the control method. Hence the conventional MRP computing method using queues will be explained below as an example.

By judging whether what hierarchy in the parts configuration an item belongs to according to the parts developed diagram of a product shown in FIG. 2, a level code can be added to the item. Some items may belong to plural hierarchies in a product, or to different hierarchies in plural products. The item may have plural level codes. Of these, the level code at the lowest point is set to as a low level code. The low level code indicates the direction in which the expansion develops to the level of a more basic item in the parts diagram. Normally, the level code represents the product level at a "0" level. The number of level codes increases as the hierarchy develops in the direction of basic items. Hence, the low level code corresponds to the largest level code among the level codes added to the item. This means that only one low level code is defined for each item, different from the level codes. The low level code of each item is set by searching all the items in the parts table before the MRP computation, and then writing the item data as information peculiar to the item.

The conventional MRP computation utilizes the low level code and decides on sequential order of expansion computation of each item on a level by level basis. Specially, the conventional MRP computing process advances through the following steps.

(1) MPS reading

The requirements read from MSP are written to the item at a product level in the MPS. At the same time, the item name is input to the level 0 queue.

(2) Starting a computation from the level 0 queue

When the MPS reading has been completed, one item name is taken out of the level "0" queue to execute the expansion computation of the item. Then, the next item name is taken out of the queue. In this case, when the requirements are developed in the expansion computation, the child item name is entered into the queue at the low level code of the child item. However, if the queue already includes a child name, that process is not executed.

(3) Level by level expansion

When a queue of a level becomes empty, one item name is taken out of the queue at the next lower level to perform the expansion computation for the item. Item names continue to be removed from the queue at the level until the queue becomes empty. When requirements are developed through expansion computation, the name of a child item is input to the queue at a low level code of the child item. However, if the queue already includes a child name, that process is not executed.

(4) Completion of MRP computation

When all queues become empty, the computation is completed.

As has already been described, the conventional MRP computation is controlled using a low level code and queue in such a manner that the parts expansion computation for each item is definitely performed after the completion of all the parts expansion computations for the parent item. However, in this control method, since the expansion computation for each resulting item is carried out sequentially, an enormous amount of processing time is needed when the number of each of the products and parts is large and the planning term is long. For that reason, the MRP computation cannot be performed frequently. For example, there is the disadvantage in that the conventional MRP computation cannot be deal quickly with certain situations, such as where the production plan is changed as a result of market trends, or the stocks or order backlog are changed. In other words, a significant problem is the fact that taking relatively long time to add the level codes makes it difficult to realize high-speed MRP computation.

For that reason a material requirements computing system which enables high speed processing by adopting the parallel processing technique has recently been proposed. Japanese Patent Laid-open publication (TOKKAI-HEI) No. 3-226845, for example, discloses such a material requirements computing system. However, since the prior art relates to a process using level codes, the above-mentioned problems cannot be solved.

On the other hand, in order to execute processing at a high-speed by executing the parallel processes, it is important to consider how the loads to be processed are distributed, like the problems of the level code. As a conventional load distributing method, there is a method of making appropriate decisions so as to equalize the amount of data processed by plural process elements. However, in the assignment obtained by using the conventional load distributing method, the communication traffic to be processed between the process elements becomes heavy, with the result that the processing time may increase somewhat. In spite of such a problem, in the conventionally-proposed parallel processing system, the load distribution has not been considered with respect to which computer should execute the data loading or requirements computation of each item.

SUMMARY OF THE INVENTION

In order to overcome the above-mentioned problems, the object of the present invention is to reduce the materiel requirements computing time.

Concretely, the first object of the present invention is to realize an effective parallel processing method for material requirements computation.

The second object of the present invention is to provide the method and device for computing material requirements, in consideration of the load distribution (or balancing) in a material requirements computation suitable for a material requirements computation executed in parallel.

The third object of the present invention is to provide the method and device for computing material requirements which can compute a load distribution at high speed.

In order to achieve the first object of the present invention, each of the MRP computing method and the MRP computing device according to the present invention, as shown in FIG. 1, includes one or more MPS reading units 1 to 3 for performing the MPS reading operation and the parts computing units 4 to 10 for performing an expansion computation for each item. The parts computing units for items are connected similarly to the configuration of the items. The parts computing unit for each item performs in its expansion computation in parallel by computing an achievable development date based on the request date of requirements accumulated (or loaded) from the parent item and then performing the expansion computation until the achievable development date.

It is not necessary to assign the expansion computing units corresponding to the number of items. The expansion computing units may be first be assigned to all items at a desired item level and then assigned to all items at the remaining item level. That is, items at a level may be handled as one group by applying the conventional level by level concept (the parts computing units are assigned to all the items in the group). In such a way, the parts computing unit can be effectively utilized. That is, the parts computing unit can be effectively used by reducing the time during which the parts computing unit does not execute its computing process.

The configuration of the present invention will be descried below in more detail.

The material requirements computing device includes production plan reading means for reading a production plan of a product; plural parts computing means for subjecting the constituent parts of the product to an expansion computation; means for relating each of the plural parts computing means with each of the constituent parts; and network forming means for forming a network by mutually connecting the plural parts computing means according to the relationships between the constituent parts of the product.

The highest one among the plural parts computing means, which forms the network, executes an expansion computation according to the status of the production plan which is read by means of the reading means, and the remaining parts computing means, other than the highest one among the plural parts computing means, which forms the network, executes an expansion computation according to the progress of the expansion computation of the upper parts computing means based on the connection relationship of the network.

Furthermore, the material requirements computing device includes memory means that stores a parts configuration table in which the constituent parts and the relationships between the constituent parts are held. The network forming means refers to the parts configuration table when the network is formed and then establishes the connection relationships between the plural parts computing means.

It is desirable that the material requirements computing device includes a network formation completion judging (determining) means for judging that a network has been completed. According to one embodiment of the invention, the network forming means establishes a connection between the plural parts computing means level by level using a low level code. The network formation completion judging means judges that the network is completely formed at the time when the connection has been completed to the lowest level.

The parts computing means sends a message to an expanding means corresponding to a child when it is connected to the parts computing means corresponding to the child. The network formation completion judging means monitors the occurrence status of the message and judges that the network has been completely formed when the message has not been produced.

In order to form the network, a parts computing means positioned at the farthest end in the parts configuration sends a message to parts computing means corresponding to its parent when it is connected to the parts computing means corresponding to its parent. When receiving the messages from all parts computing means corresponding to its children, the parts computing means not positioned at the farthest end in the parts configuration sends a message to the upper parts computing means corresponding to its parent. The network formation completion judging means judges that the network has been completely formed when all parts computing means positioned at the highest level among the constituent parts have received the message.

In order to achieve the first object, the present invention operates as follows:

One or more MPS reading units 1 to 3 perform the MPS reading operation and then send the requirements of the product read as a loading message to the corresponding parts computing units 4 to 6.

Each of the parts computing units 4 to 10 calculates the achievable development date based on the own parent item, or requirements or the request date sent from MPS, and then executes the expansion computation until the achievable development date. Particularly, the result developed up to the achievable development date in the requirements expansion computation is sent to the parts computing unit, which performs an expansion computation of a child item.

When receiving all end reports from its parent item or MPS, each of the parts computing units 4 to 10 sends an end report to its child item and completes its operation.

Next, the configuration of each mode described above will be explained below in more detail. For brevity of the explanation, the parts computing unit corresponding to its parent is referred to simply as "parent" and the parts computing unit corresponding to its child is referred to simply as "child"

The network forming means (or parts computing unit producing means) provides a network by relating the parts computing unit to every product forming part and then mutually connecting with the same configuration as the parent to child relationship between parts (hereinafter, referred to as "parts configuration"). The network forming means (or parts computing unit producing means) obtains information on the parent to child relationship between the parts computing units by referring to the parts configuration table.

The network formation completion judging means judges whether a network has been completely formed. There are various concrete judging methods. For example, in one embodiment of the invention, when the network forming means (or parts computing unit producing means) is connected level by level to other parts computing units using low level codes, the network formation completion judging means can judge that the network has been completed when the connecting process has reached to the lowest level.

Moreover, when the expansion unit is connected to another expansion unit by sending a message to the expansion unit corresponding to its child, the network formation completion judging means judges that the network formation has been completed when the message has not been produced.

Moreover, the expansion computing unit positioned at the end in the parts configuration sends a message to its parent when it has been connected to its parent. On the other hand, the expansion computing unit not positioned at the end sends a message to its parent when the message has been received from all its children. In such a case, the network formation completion judging means judges that the network formation has been completed when all the expansion computing units positioned at the highest level in the parts configuration have received the message.

After the completion of a network, the parts computing unit begins the expansion computation. Since the network is initially formed in the first mode, the following expansion computation is soon started without performing the network forming process.

The MPS reading unit reads the production plan. The parts computing unit develops its expansion computation based on the production plan (or the result obtained by another parts computing unit).

The present invention aims at reducing the processing time by mutually executing the parallel expansion computation using the parts computing units. That is, the parts computing unit positioned at the highest level in the parts configuration develops its expansion computation according to the condition of a production plan read by the corresponding MPS reading unit. In the same way, the parts computing unit which is not positioned at the highest level in the parts configuration develops according to the progress of the expansion computation of its parent.

Each expansion computing unit can begin the expansion computation even if its parent has not sent the result of the expansion computation for the whole duration of the production plan. That is, the parts computing unit executes the expansion computation by partitioning the duration every predetermined time interval. The result obtained in each time interval is sequentially sent by its child. Thus, while all the parents are sending the result of expansion computation (note: it is not necessary for it to be the whole time interval in the production plan), the child begins sequentially execute the expansion computation.

The first object of the present invention is achieved according to the above-mentioned operation.

Moreover, in order to establish the second and third objects, we have studied the parallel material requirements computation in detail. As a result, in the parallel material requirements computation, the data exchange can only take place between items that are each in a parent to child relationship, but does not occur randomly between items. Hence, we have noticed that assigning each of the items each in a parent to child relationship in the same computer or an adjacent computer allows the communication traffic between computers to be reduced so that the processing time of the parallel material requirements computation can be reduced.

That is, in order to achieve the second and third objects, the material requirements computing device configuration includes means for reading an object item of a master production plan and then distributing the same to plural expansion computing units; means for developing the item obtained in each of the expansion computing units into a child item using a parts configuration list and then determining the locations of items other than the shared item in the expansion computing unit; means for determining the location of the shared item in the shared item assigning unit according to the item assignment status in each expansion computing unit; and means for controlling so as to synchronously develop the process in each expansion computing unit.

The configuration of the present invention will be described in more detail as follows:

In the second aspect of the present invention, the material requirements computing device that decides a load distribution when plural requirements computing units execute a material requirements computation in parallel includes a MPS reading unit, a shared item assigning unit, and an expansion computing unit assigned in correspondence with each of the plural expansion computing units. The MPS reading unit reads an item included in a production plan prepared differently and then decides on the assignment of the requirements computing unit for each item, and then reports the result to the expansion computing unit corresponding to the requirements computing units. The shared item assigning unit decides which requirements computing unit is assigned to the item reported from the expansion computing unit and reports the result to the expansion computing unit corresponding to the requirements computing unit. The expansion computing unit assigns the item reported from the MPS reading unit or the shared assigning unit to the requirements computing unit corresponding to itself. The expansion computing unit also executes the expansion (developing) process of confirming the item corresponding to a child item assigned to the requirements computing unit corresponding to itself; reports, to the shared item assigning unit, which items, among items corresponding to child items confirmed in the developing process, are items shared by plural items; and assigns the items not shared among the requirements computing unit corresponding to itself.

In this case, the material requirements computing device includes an expansion control unit. The expansion control unit performs the expansion process for every level in the parts configuration showing the parent to child relationship between items. When the expansion process in a level is completed, the fact is reported to the expansion control unit and the expansion process is temporarily suspended until the expansion control unit receives the resume instruction for the expansion process. The expansion control unit instructs the shared item assigning unit to start determining the item to be assigned after the expansion process completion reports have been received from all the expansion computing units, and instructs the expansion computing unit to resume the expansion process after the shared item assigning unit has reported that the assignment destinations of all items reported from the expansion computing unit have been determined. Preferably, the shared item assigning unit starts determining the target destination when it has received the start instruction from the expansion control unit, and then reports to the expansion control unit the fact that the target destinations of all items reported from the expansion computing unit has been determined.

It is preferable that the shared item assigning unit selects the requirements computing unit which is assigned an item among requirements computing units which are assigned items corresponding to parent items reported from the expansion computing unit.

It is more preferable that the shared item assigning unit determined as a target destination of the item the requirements computing unit being assigned the smallest number of items at that time among requirements computing units in which items corresponding to parent items reported from the expansion computing unit have been assigned.

Preferably, the requirements computing unit has a memory unit including an assignment status table which stores items assigned in the requirements computing unit and the relations corresponding to them.

Preferably, the shared item assigning unit sequentially describes the assignment places of each of the items whose target destination has been determined on the assignment status table and determines the destinations to be assigned of the items by referring to the assignment status table.

In the third aspect of the present invention, the material requirements computing method which determines the load distribution when plural requirements computing units execute a parallel material requirements computations, includes the steps of reading an item included in another production plan; performing an expansion process by determining a requirements computing unit to which an item is assigned and by confirming an item corresponding to a child item; assigning the item not shared by other items, among items corresponding to the child item, to the requirements computing unit; and then assigning the shared items to any one of the requirements computing units to which the item corresponding to a parent item is assigned.

In this case, the expansion process and the assignment of items corresponding to child items confirmed in the expansion process may be developed by the level in the parts configuration.

In order to achieve the second and third objects, the present invention operates as follows:

Hereinafter, the item corresponding to a child may be simply referred to as "child" or "child item" and the item corresponding to a parent may be simply referred to as "parent" or "parent item".

The MPS reading unit reads the item included in another production plan. Then, the MPS reading unit determines a requirements computing unit to which the item read is assigned, and then reports the data to the expansion computing unit corresponding to the requirements computing unit.

The expansion computing unit assigns the item reported from the MPS reading unit to the requirements computing unit corresponding to itself. Moreover the expansion computing unit executes the expansion process and then confirms the child item of an item assigned in the requirements computing unit corresponding to itself. The items shared by plural items among the child items confirmed are reported to the requirements computing unit corresponding to itself. On the other hand, the items not shared are assigned in the requirements computing units corresponding to itself.

The shared item assigning unit determines the requirements computing unit which is assigned to items reported from the expansion computing unit. For example, the communication traffic in the material requirements computation can be reduced by selecting a destination to be assigned among requirements computing units in which items reported from the expansion computing units are assigned. Moreover, the load distribution can be equalized by selecting a requirements computing unit to which a small number of items are assigned. Such an assignment location can be easily determined by preparing the assignment status table which stores the relationship between a requirements computing unit and items assigned in the requirements computing unit, sequentially describing the assignment location for an item whose assignment destination is determined in the assignment status table, and then referring to the assignments status table when the assignment location is determined.

The shared item assigning unit reports the decision to the expansion computing unit corresponding to the destination to be assigned thus determined (requirements computing unit). The expansion computing unit assigns the item reported from the shared item assigning unit to the requirements computing unit corresponding to itself.

When the above-mentioned process is developed by level, the expansion control unit controls the expansion computing units so that they are synchronized to each other. That is, when the expansion computation in a level has been completed, the expansion computing unit reports the completion to the expansion control unit. Then the expansion process is then temporarily ceased. The expansion control unit instructs the shared item assigning unit to start determining the location to be assigned when it receives the expansion process completion report from all the expansion computing units. The shared item assignment unit starts a determining the location to be assigned when it receives a start indication from the expansion control unit. After determination of the destinations to be assigned among all the items reported from the expansion computing unit at that time, the shared item assigning unit reports the determination to the expansion control unit. After being notified from the shared item assignment unit that the destinations to be assigned among all the items reported from the expansion computing unit at that time has been determined, the expansion control unit instructs the expansion computing unit to resume the expansion process. The expansion computing unit which has received the resume indication then resume the expansion process.

DESCRIPTION OF THE PREFERRED EMBODIMENTS

Embodiments of the present invention will be explained below by referring to FIGS. 3 to 17.

First, the concept of each embodiment will be described. Let us explain the MRP computation or calculation in the parts configuration shown in FIG. 3. The parts configuration includes three kinds of products A, B, and C each having shared parts or components. The lowest low level code is 6.

The MRP computation is for executing an expansion computation (or parts development computation) to all items shown as blocks in the Figure. The computation must be performed to an item after the parent item has been completely calculated. In the conventional sequential computation, the expansion computation is performed according to the arrows shown in FIG. 4. That is, the whole computing process is developed level by level basis. The expansion computation is sequentially carried out to the item belonging to each level.

Figure 5:
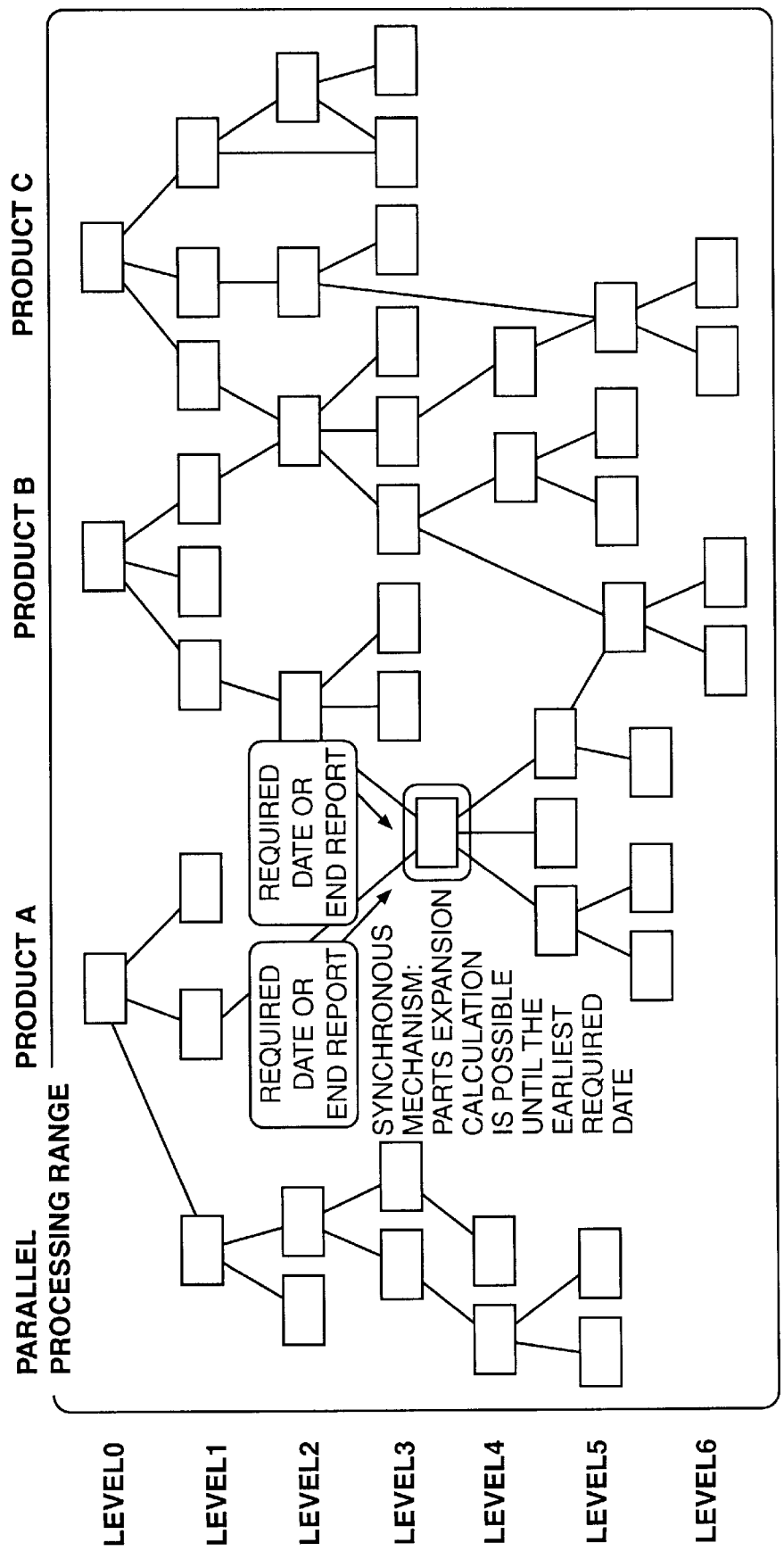
FIG. 5 is a diagram showing the concept of an expansion date paralleling according to the present invention.

However, the present embodiment does not use the low level codes. The concept of the present invention is to utilize maximal improvement to the parallelism of an expansion computation to each item by computing its achievable development date according to a request date and an end report from the parent item of each item, and then advancing the computation until the achievable development date, as shown in FIG. 5. Hereinafter, this method is called "expansion parallel method". In the expansion parallel method, there are a number of parts computing units each of which performs an expansion computation to each item corresponding to the same number as items to be performed. The parts computing units are mutually connected using the item-to-item network and the analogous network in the parts configuration. That is, each part computing unit is connected to the parts computing unit of the parent item and the parts computing unit of the child item belonging to its own item to be computed, so as to only exchange communications between them. The progress of the computation of the parent item can be ascertained from the request date of requirements (requested amount) transmitted to the child item via the network. The decision term during which the total requirements does not vary later can be calculated later based on the progress of all parent items of itself. If the last date of the decision term is an achievable development date, the expansion computation can be performed up until the achievable development date. The developed result is further sent to the child items via the network. Thus, the same result as that obtained through the conventional MRP computation in which the expansion computation is carried out to the child item after the expansion computation has been completed to a parent item, can be obtained in each item. In some cases, the computation with high parallelism may alternatively be realized by applying the expansion computation to all items at the same time.

Figure 1:
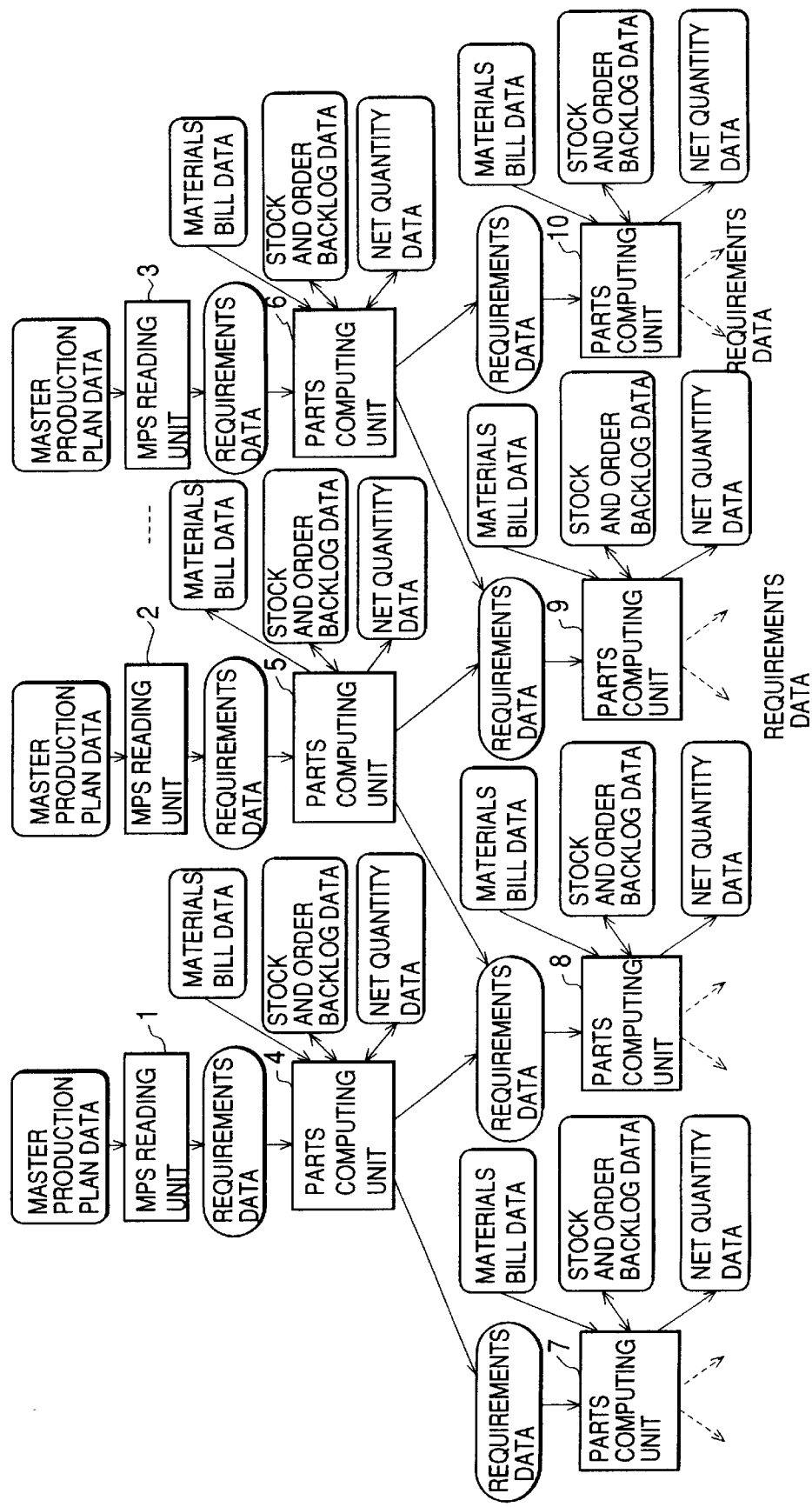
FIG. 1 is a block diagram showing the overall configuration of the material requirements computing device according to the present invention.
Figure 2:
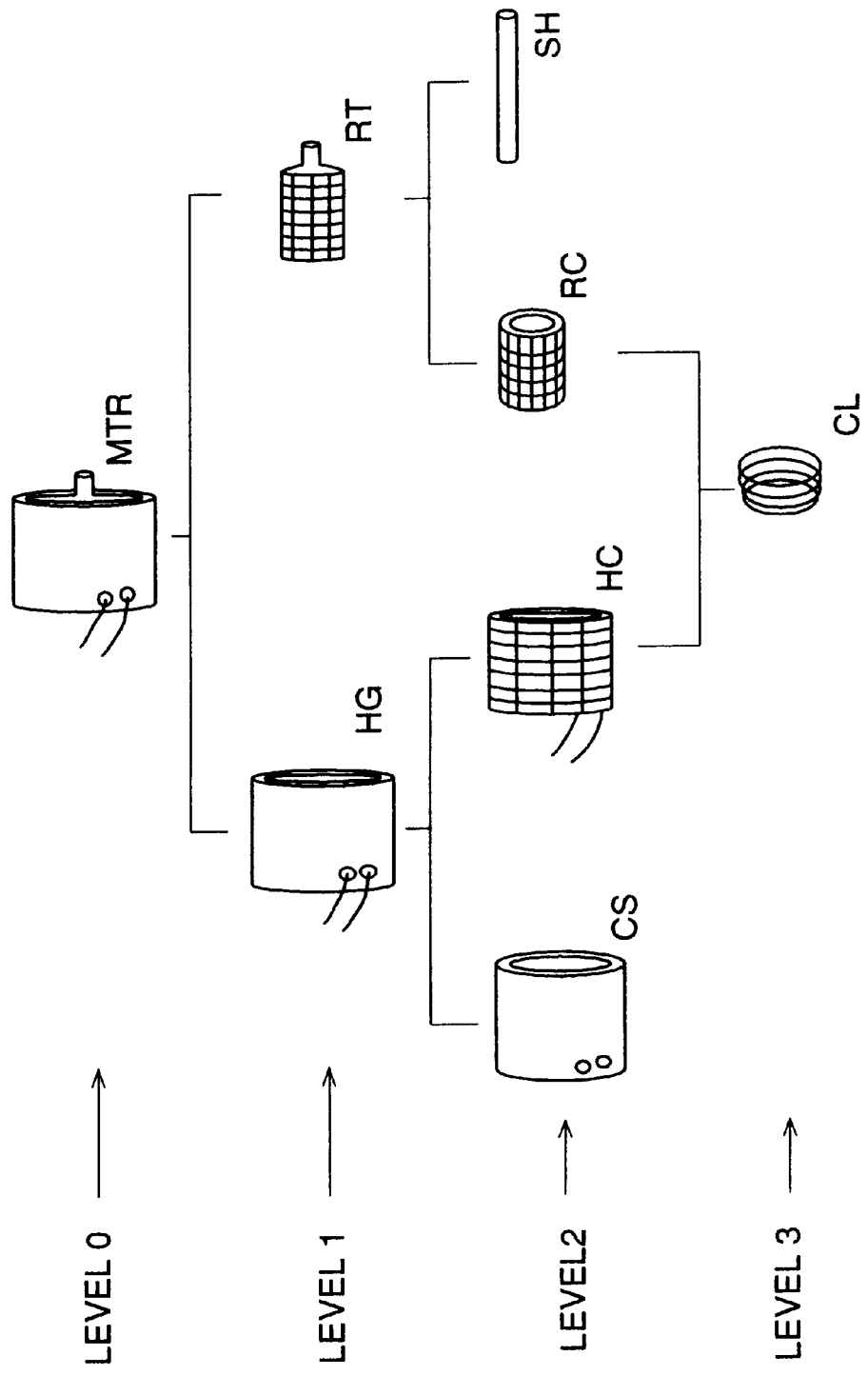
FIG. 2 is a parts expanding view and an explanatory view for low level codes.
Figure 3:
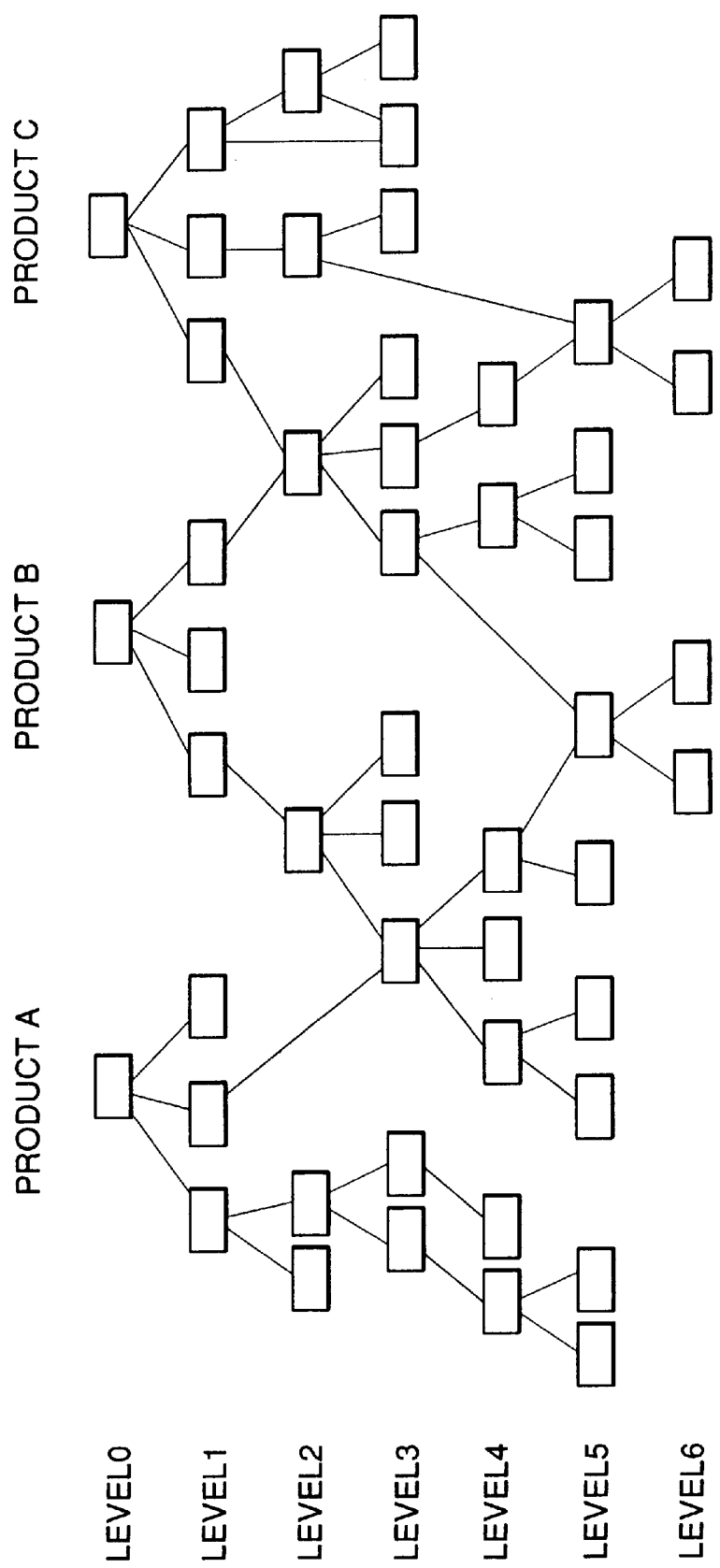
FIG. 3 is an explanatory view illustrating a parts configuration.
Figure 4:
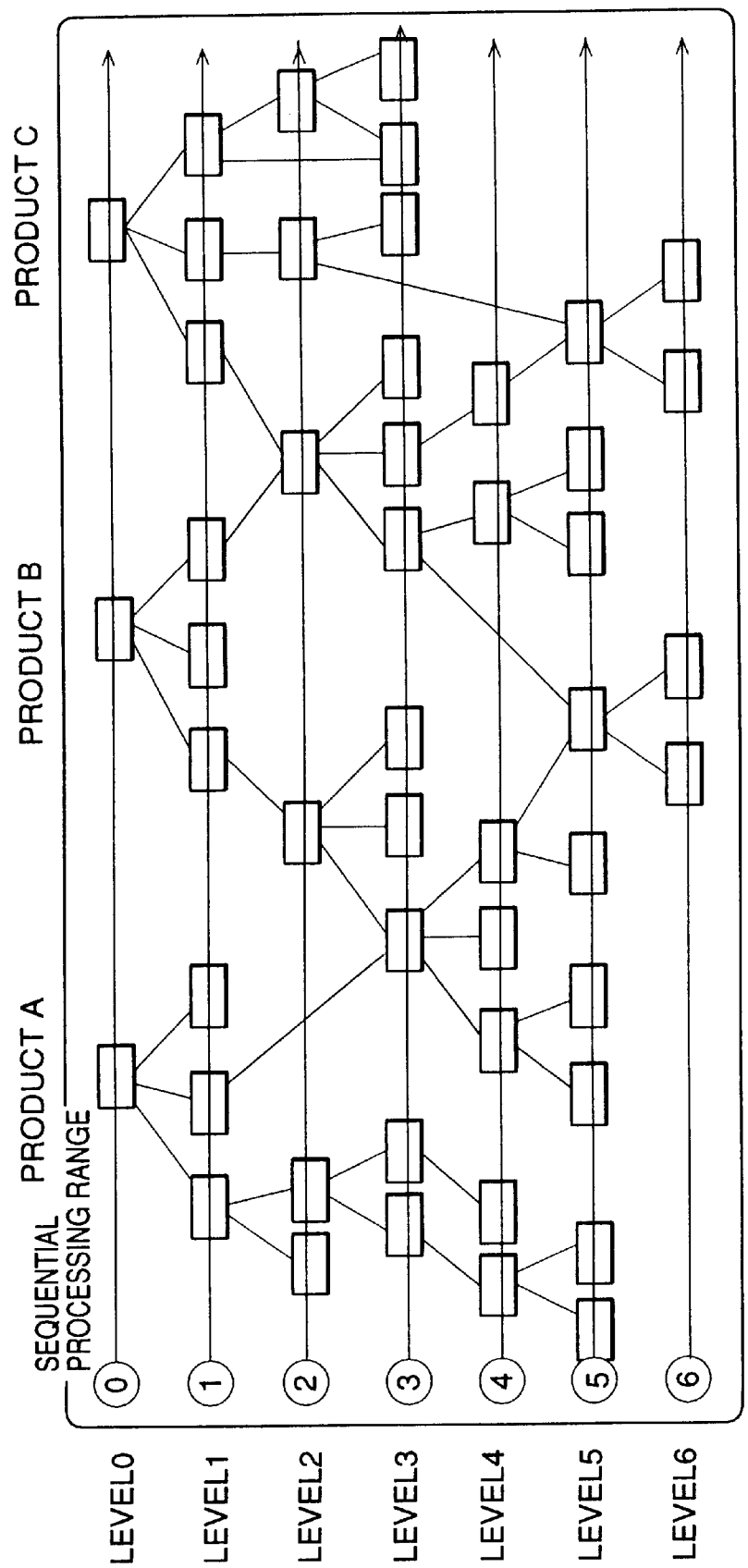
FIG. 4 is a diagram of showing the concept of the sequential computation in a prior art.

FIG. 1 shows the overall system configuration based on the above-mentioned concept.

Next, the common features will be explained before entering the details of the present embodiment.

Figure 6A:
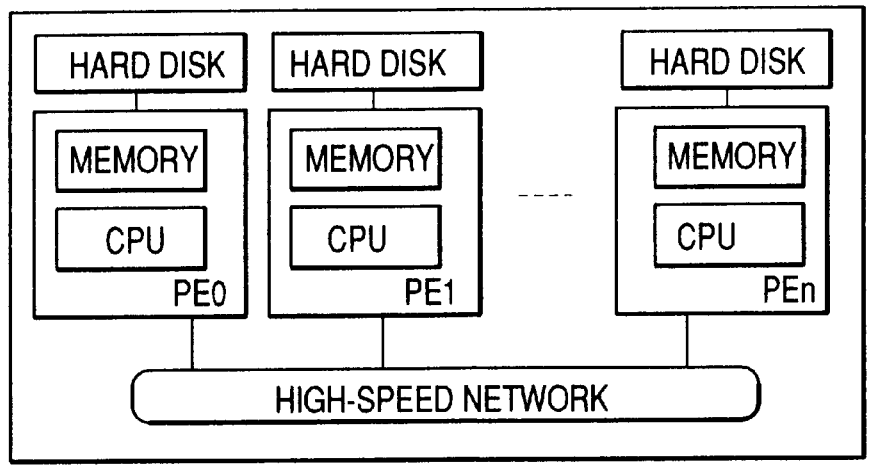
FIGS. 6A and 6B are diagrams each showing the outline of a loosely-coupled non-file-sharing parallel computer.
Figure 6B:
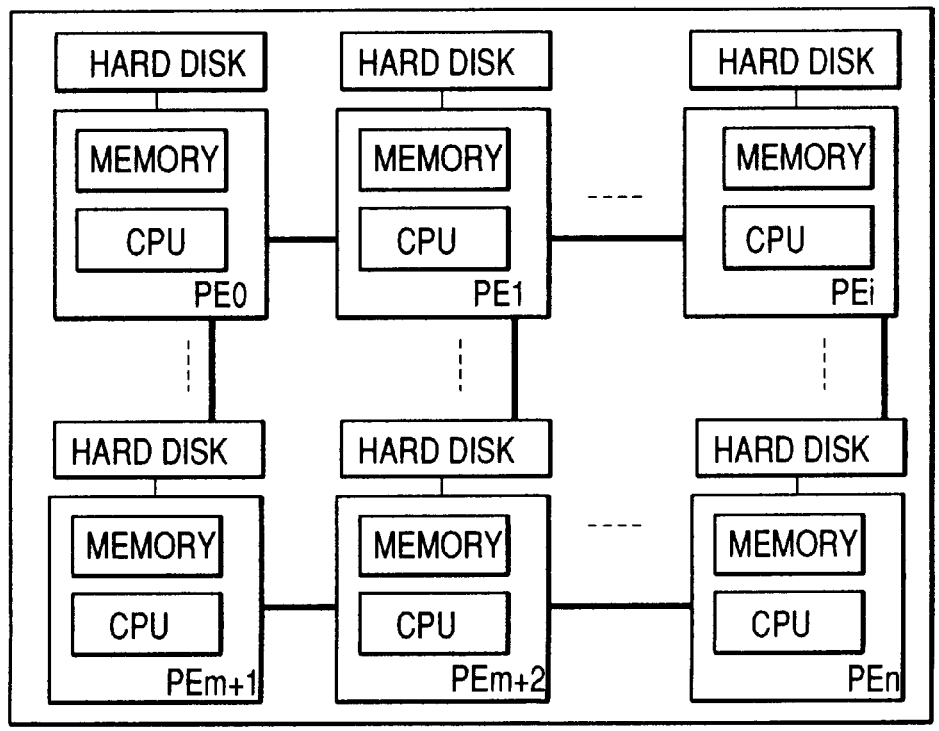
Figure 7A:
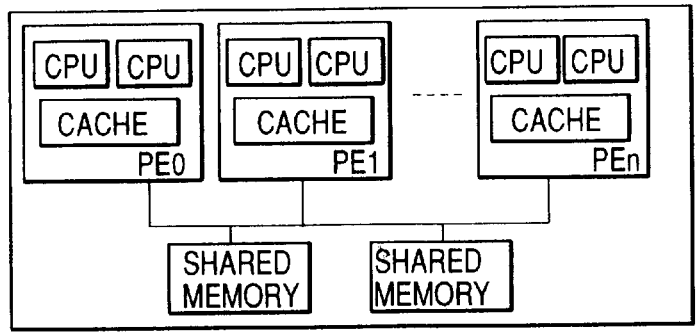
FIGS. 7A–7C are diagrams each showing the outline of other parallel and distributed computer environment.
Figure 7B:
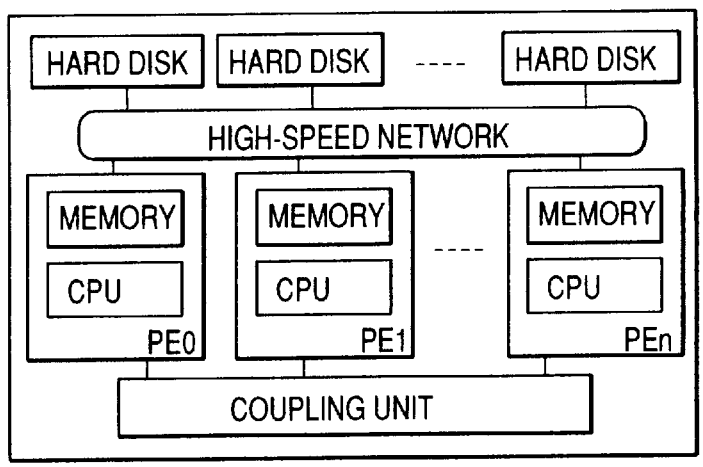
Figure 7C:
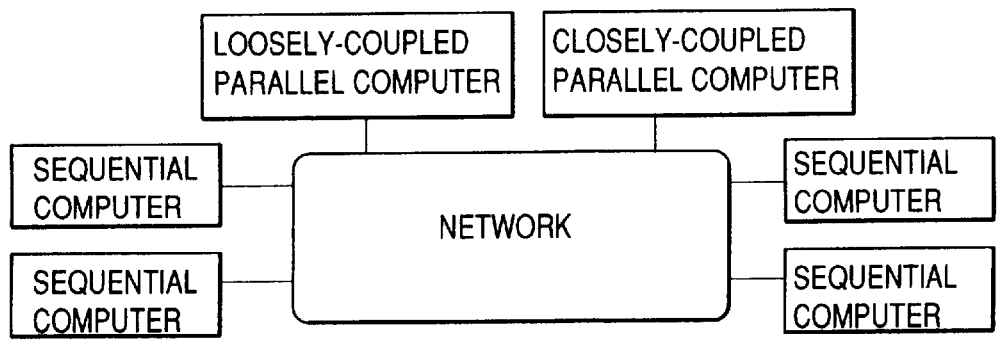

The present embodiment is the loosely-coupled non-file-sharing parallel computer, shown in FIGS. 6A and 6B. The present embodiment is applicable to a the closely-coupled parallel computer, as shown in FIG. 7A, a loosely-coupled file shared computer, as shown in FIG. 7B, or a distribution environment, as shown in FIG. 7C, in which the parallel computers or conventional-sequential computer are coupled via a network. In FIGS. 6A and 6B, each PE (Processing Element) loosely-coupled is a single CPU. However, the present invention can be embodied by using a memory-sharing closely-coupled multiple-CPU as each PE.

Figure 8A:
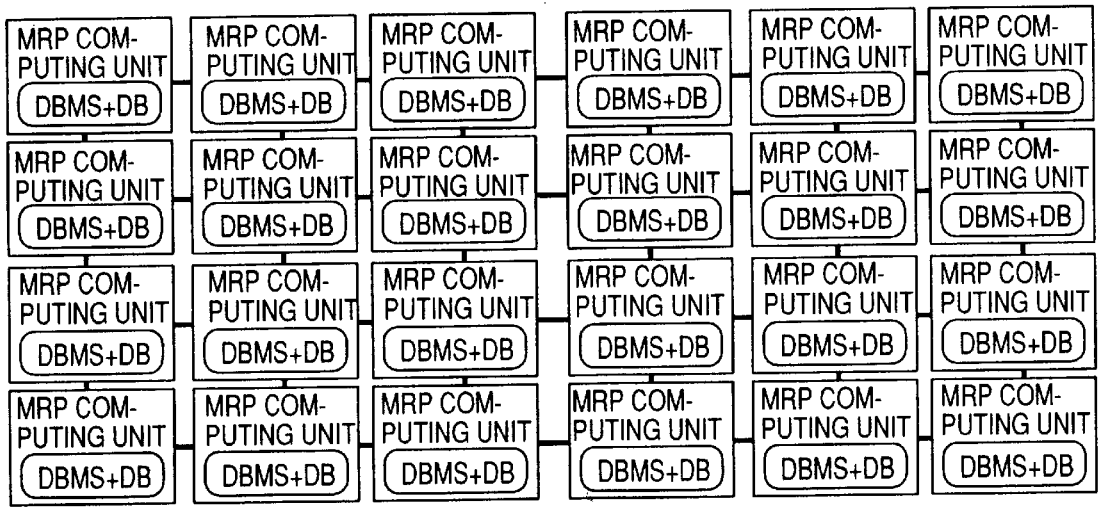
FIGS. 8A and 8B are diagrams each showing a data storage system.
Figure 8B:
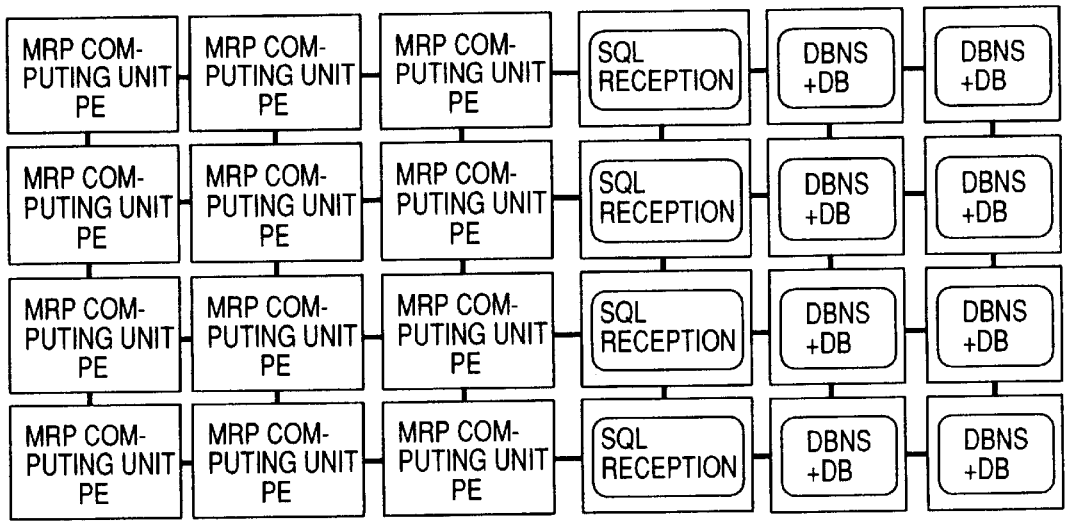

In the embodiment, FIG. 8A shows the example where database management systems are distributively assigned to loosely coupled PEs. However, the present embodiment is applicable to the case where the database management systems are centrally administrated to the specific PE as shown in FIG. 8B. It is possible to use a conventional file system without using the database system.

In the following explanation, a mass of computation is called a process. A set of plural processes is also called a process. The multi-tasking operating system can execute plural processes in parallel on one PE. In the present embodiment, explanation is given for the model where processes are mutually communicated using the multi-tasking operating system. For example, the single tasking system can be easily realized in which one process is always executed on one PE by assigning the mechanism of assigning operable processes into a queue and then sequentially executing it.

The terms "concurrent" and "parallel" are defined here for use in the later explanation.

The term "concurrent" indicates the status in which plural processes can be executed independently and simultaneously or can be operated logically and simultaneously. However whether processes are specially performed physically and simultaneously is not referred to. For example, when plural processes operate on the PE in time sharing mode, like the multi-tasking operation, they can be referred to as operating "concurrently". However, in the event that the PE is a single CPU, only one process is actually operating. On the other hand, the term "parallel" indicates that plural processes are operating physically and simultaneously. When the processes are operating on plural PEs, they are operating in "parallel". The concept of "parallel" represents larger than that of "concurrently". The processes running in "parallel" are always running "concurrently". However, the processes which are running "concurrently" are not necessarily running in "parallel". In the present embodiment, explanation is given for the model where plural processes run "concurrently" while exchanging messages. All the processes can be executed with all the processes being assigned to a single PE. However, the parallel processing can also be performed by assigning all processes to plural PEs. As described above, plural processes assigned to each PE can be operated in a multi-tasking mode by finely dividing each process. However, each process in an operable state can be sequentially executed without any alternation.

The present embodiment will be explained with respect to a computation model in which a message is sent from one process to another process on a first-in first-out basis. The computation model in which the sending order is not preserved can be embodied by assigning, for example, the mechanism which sends a message with a serial number to a process and then processes the message in the order of the serial numbers on the receiving side.

Figure 9:
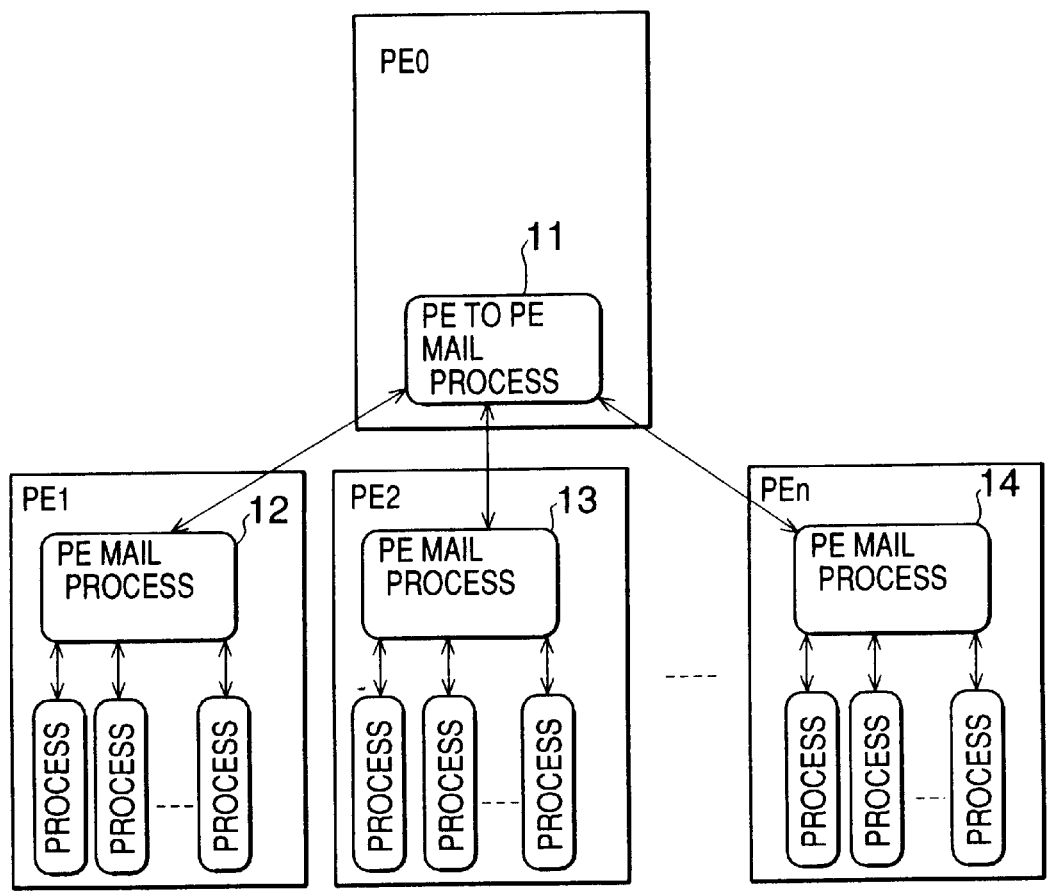
FIG. 9 is a diagram showing a post office system.

When a message is sent from one process to another process, it is necessary to know on which PE the process is currently running. Thus, the system can be simply constructed by centrally managing the process to PE relationships and performing communications between processes based on thus management. Various methods include the PE to PE communication method, in addition to the conventional software utilizing method called a distribution environment middleware. However, the communication method called the "post office method" as shown in FIG. 9, will be explained in the present embodiment. A single PE to PE mail process 11 which centrally manages the process to PE relationships is assigned. In response to a message to a process, the PE to PE mail process 11 transfers the message to the PE handling the process. Each PE includes one of the PE to PE mail processes 12 to 14. The message transferred from the PE to PE mail process 11 is transferred to a destination process. When the process in a PE transfers a message to another process, the process name of the destination is written so as to transfer it to the PE to PE mail processes 12 to 14 within that PE. If the destination process currently running within the same PE, the PE to PE mail processes 12 to 14 rapidly transfer to the process. If this is not the case, the PE to PE mail processes 12 to 14 transfer the process to the PE to PE mail process 11. In this mechanism, each process can proceed with the exchange of a message even if it is not known in which PE a destination process is running on. Particularly, in the MRP computation, the PE to PE mail process 11 understands which PE executes the expansion computation to each item. Each of the PE to PE mail processes 12 to 14 understands only the item name calculated by its own PE. Even if the PE to PE processes 12 to 14 know nothing, a message is definitely received via the PE to PE mail process 11. In this case, the communication time increases. The process to process communication method using the post office system is merely an example. Another method can be utilized in the present invention.

There are a number of ways of carrying out the process to PE assigning operation. In this embodiment, one example of the assigning method is shown. Another assigning method can be utilized in the present invention.

An embodiment of the expansion date paralleling method will be explained below.

Figure 10:
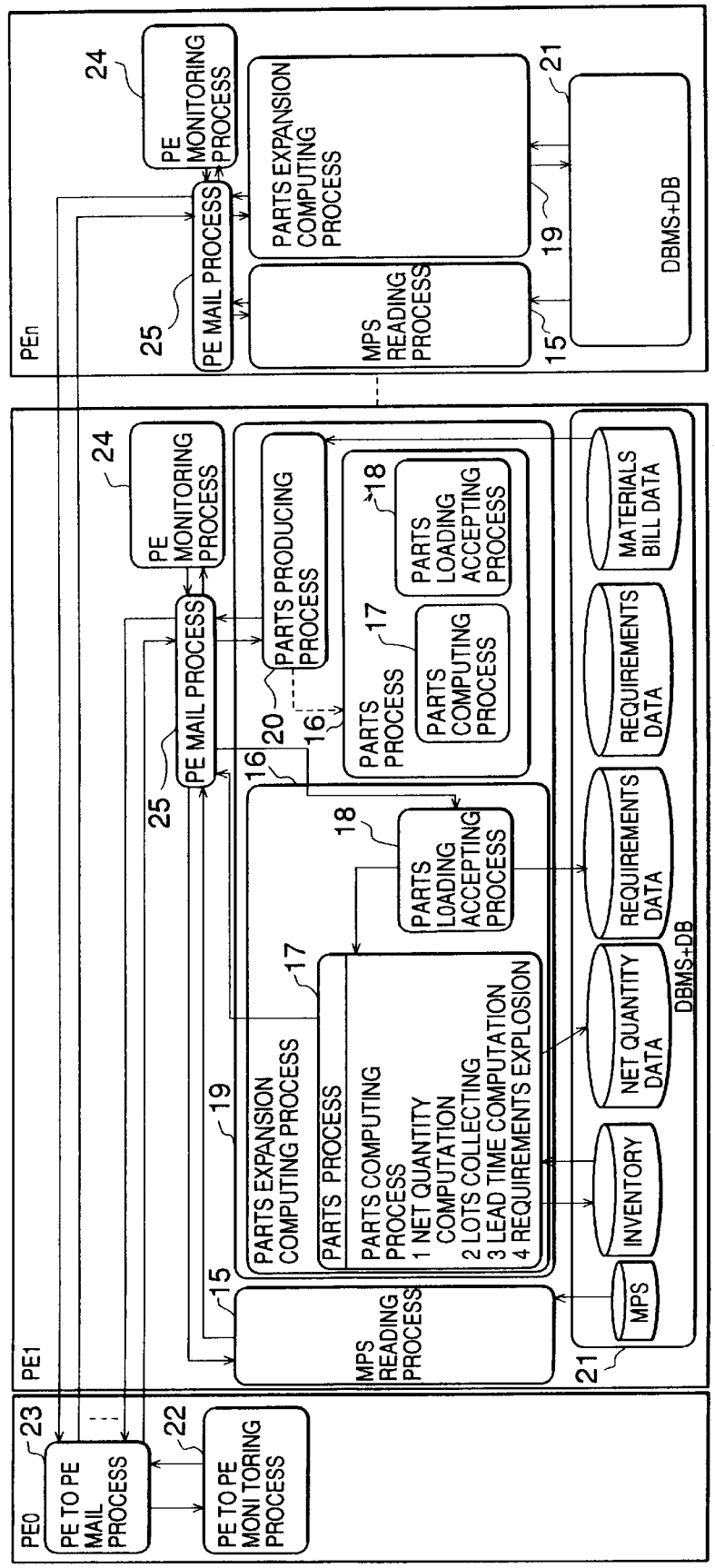
FIG. 10 is a diagram showing an expansion date paralleling process model.

Referring to FIG. 10, the overall configuration will be explained.

A loosely-coupled non-file-sharing parallel computer consisting of N PEs (PE0, . . . PEi, . . . , PE(N−1)) is assumed. In such a system, a database management system and database 21 exist in each PE.

The process located on the PE1 to PEn will be explained here.

Each of PE1 to PEn includes an MPS reading process 15, a expansion computing process 19, a PE monitoring process 24, and a PE to PE mail process 25.

The MPS reading process 15 corresponds to the MPS reading units 1 to 3 . . . shown in FIG. 1.

The expansion computing process 19 includes plural parts processes 16, and a parts producing process 20 producing a parts process.

The parts process 16 corresponds to the parts computing unit 4 to 10 . . . shown in FIG. 1. The parts process consists of two processes: a parts computing process 17 which performs an expansion computation of an item, and a parts loading acceptance process 18 which accepts a loading message for the item.

The parts producing process 20 produces a parts process 16. The expansion computing process 19 determines previously determines plural items to be computed. Hence, the parts producing process 20 definitely produces one parts process 16 corresponding to every item every to be computed in the expansion computing process 19.

The expansion computing process 19 (not shown in FIG. 10 internally contains the function of managing plural parts processes 16.

The PE to PE mail process 25 relays items of mails exchanged between processes assigned in the PE. Hence, the PE to PE mail process 25 communicates with the MPS reading process 15, the expansion computing process 17, and the like. The PE to PE mail process 25 communicates with the PE to PE mail process 23 located in PE0 to handle mail items exchanged between a process in the corresponding PE and a process on another PE.

The PE monitoring process 24 monitors the mail exchange within the PE. For that reason, the PE monitoring process 24 can communicate with the PE mail process 25. The PE to PE monitoring process 22 located in PE0 monitors the mail exchanged between PEs.

Next, the process located on the PE0 will be explained.

PE0, which controls communications between PEs, includes the PE to PE monitoring process 22 and the PE to PE mail process 23.

The PE to PE mail process 23 handles the mail transmitted from the PE mail process 25 within a PE to the PE mail process 25 within another PE.

The PE monitoring process 22 is a process for monitoring mail items transferred with the mail processes 23 and 25 for a given duration. For that reason, the PE to PE monitoring process 22 can communicate with the PE to PE mail process 23. In this embodiment, the PE to PE mail process 22 controls the initial start-up.

The network formation completion judging means defined in the claims section is realized by cooperative operation of the PE to PE monitoring process 22, the PE monitoring process 24, and the like. The network forming means is chiefly realized by means of the parts producing process 20. The parts configuration table corresponds to a parts data table stored in the database 21.

That conclude the general outline of the embodiment.

Next, the configuration of the parts process 16 will be explained in more detail with reference to FIG. 11.

The parts process 16 described above consists of two processes: the parts loading acceptance process 18 and a arts computing process 17.

The parts loading acceptance process 18 is formed of a request time bucket management process 26 and a total requirements computing process 27.

The requirements time bucket management process 26 prepares a requirements time bucket for every parent item. In response to a loading message sent from the parts process 16 for a parent item,. the requirements time bucket management process 26 performs management of how many requirements (requested quantity) have come from which parent for which request date, according to the requirements time bucket controlled by the parent item, and then calculates the achievable development date. A request for updating of the requirements data is passed to the requirements management process 31. The loading message is formed of a parent part name, a requested quantity, and a request date.

The total requirements computing process 27 receives an achievable development date, which is computed in the requirements time bucket management process 26, and then computes the total requirements until the achievable development date for every one time bucket. For brevity of the explanation, it is assumed below that one time bucket is one day below.

The parts computing process 17 is formed of a net requirements computing process 28, a lot collecting process 29, and a requirements expansion process 30.

The net requirements computing process 28 advances the reserving process and the inventory control process 32, based on information on the total requirements for every one time bucket (one day) calculated by the total requirements computing process 27, and then computes the net requirements on a per day basis. The net requirements management process 33 receives a request to update net requirements data, based on the computation result.

The lot collecting process 29 collects lots, in response to information on the net requirements on a per day basis.

The requirements expansion process 30 obtains a launch date by subtracting the lead time from the request date of the lot, based on the net requirements collected for a lot. Moreover, with the day before the launch date set as a request date for a child item, the requirements are computed using the number of child items. The requirements and request date thus obtained are sent as a loading message to the parts process of each item, together with the name of an item (note: a parent part name to the item child item).

As described above, the parts process 16 includes plural processes. The output of each process is handled as the input of the next computing process. Each process always goes from the past to the future. If each process is executed while on a different CPU, it is expected that the pipeline parallel process can be operated at a high speed.

Next, the overall operation of the present embodiment will be explained, along with the progress of the MRP computation, by referring to FIGS. 10 and 12 to 17.

Figure 12:
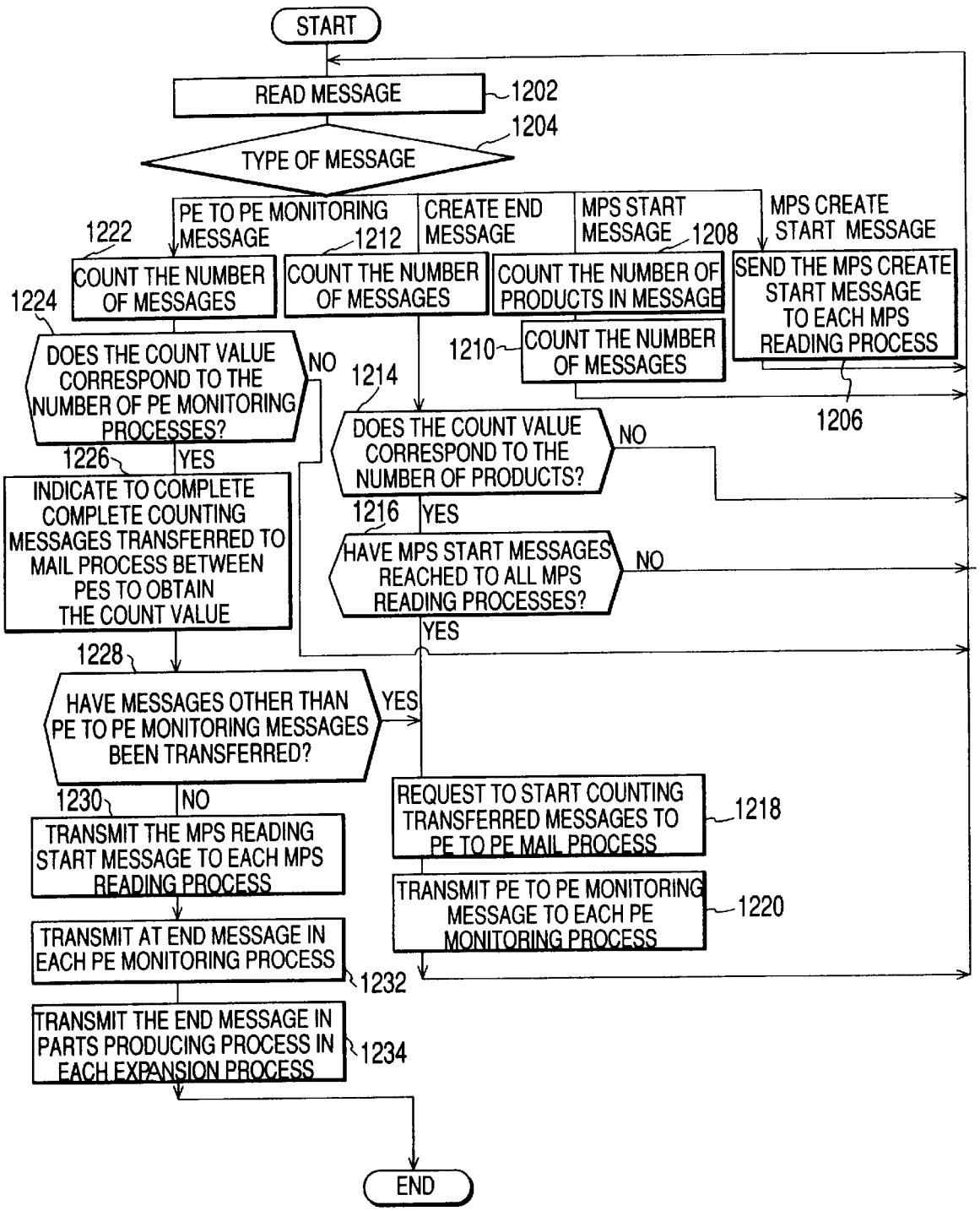
FIG. 12 shows a flowchart of the PE-to-PE monitoring process 22.
Figure 13:
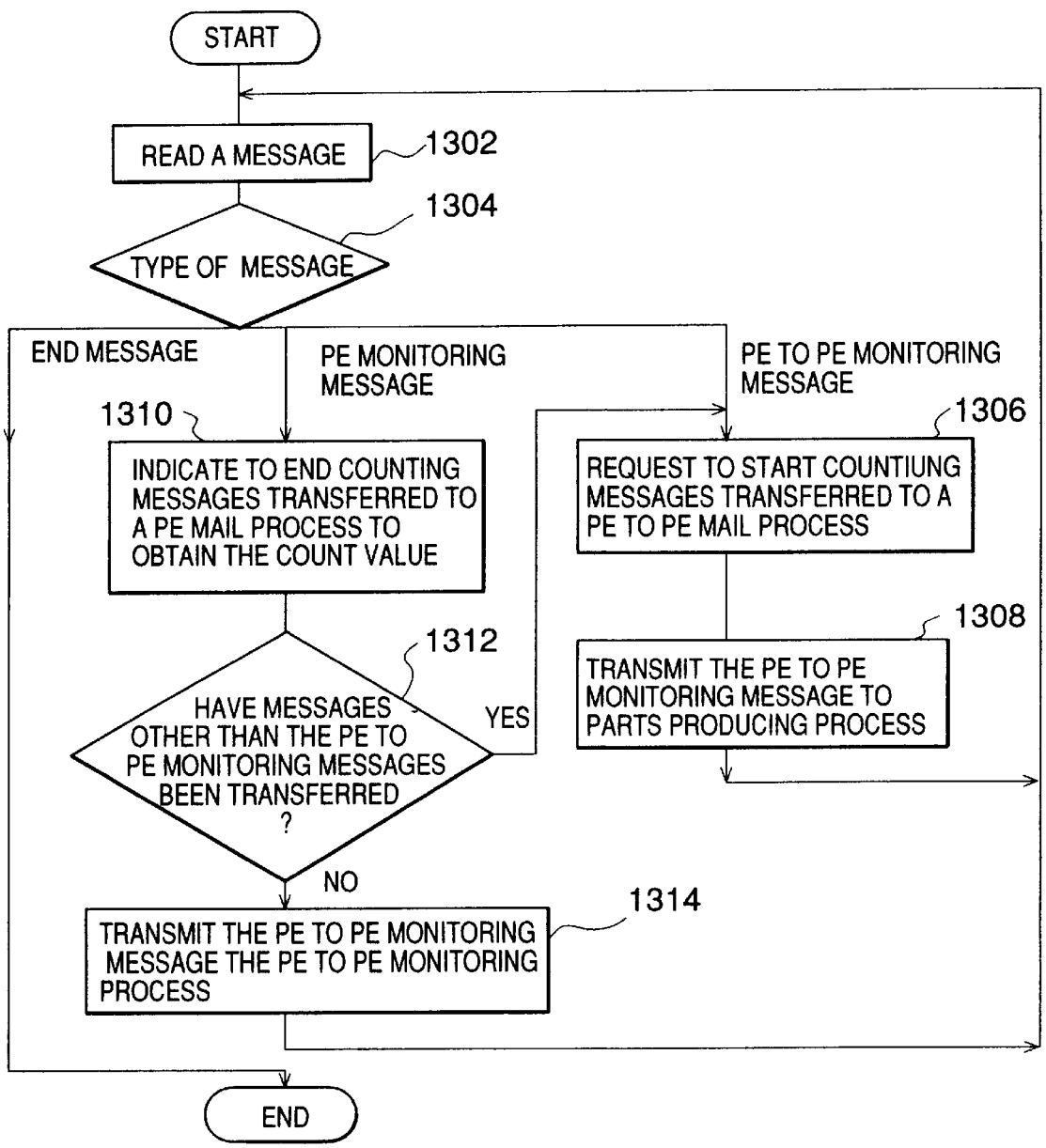
FIG. 13 shows a flowchart of the PE monitoring process 24.
Figure 14:
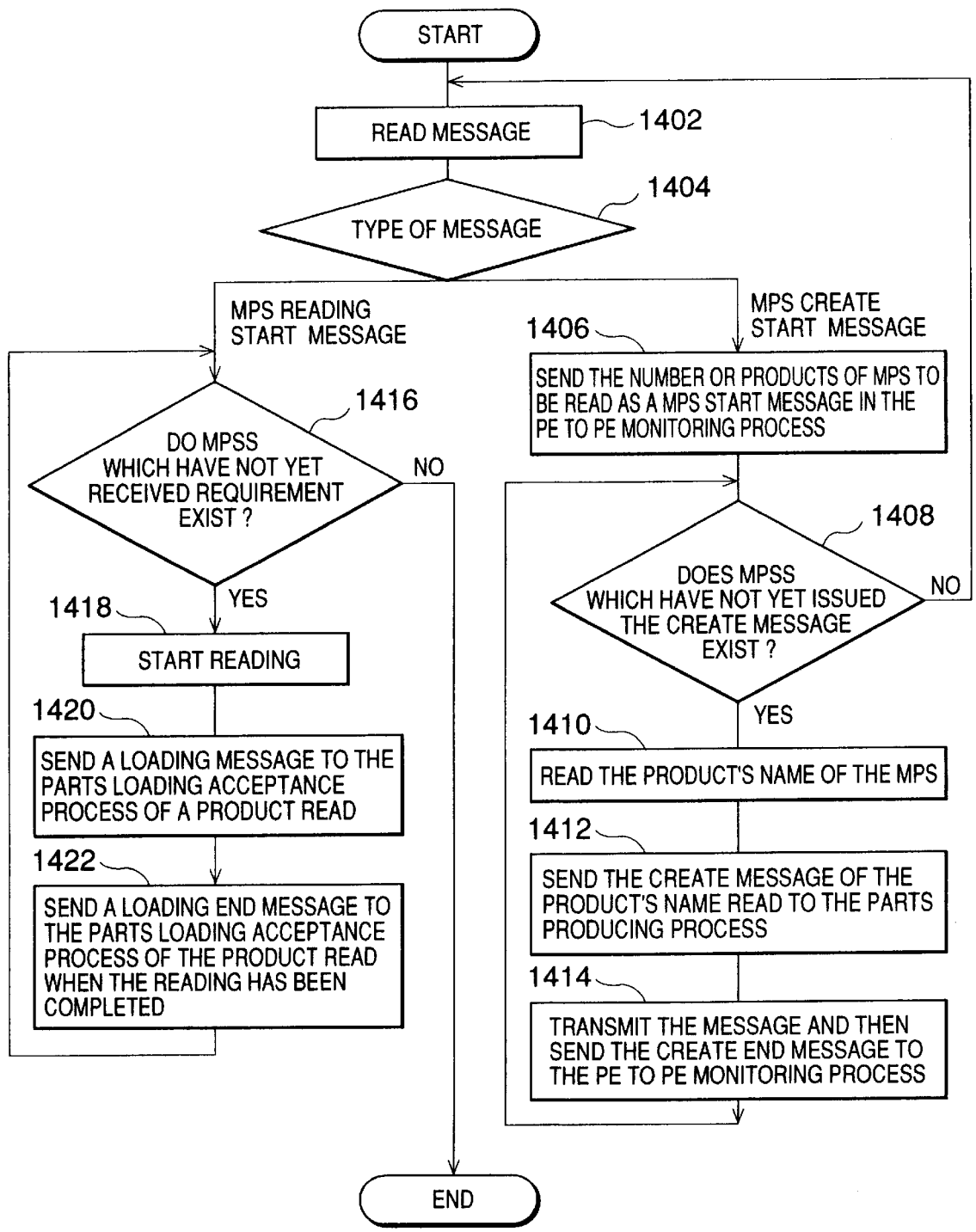
FIG. 14 shows a flowchart of the MPS reading process 15.
Figure 15:
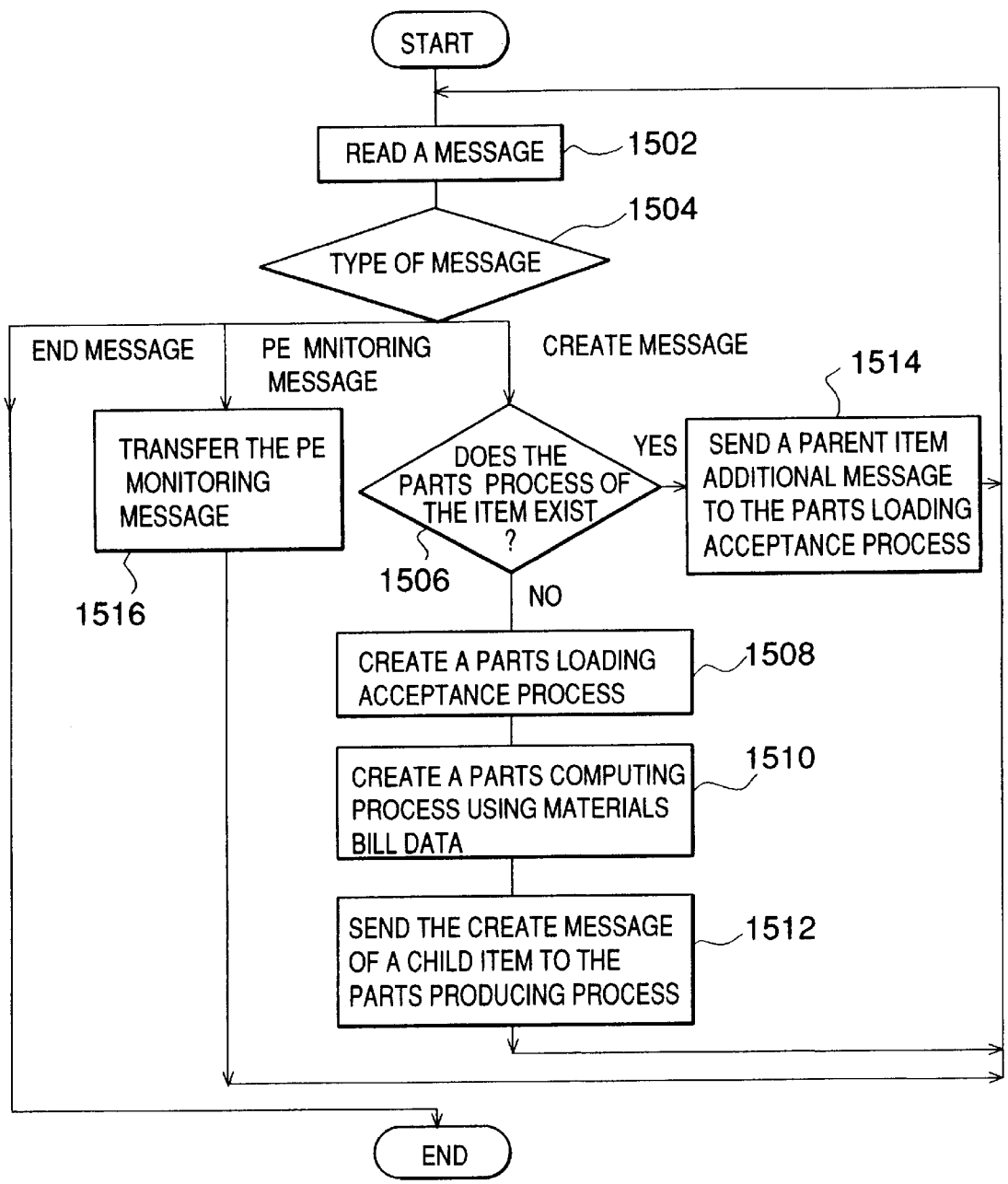
FIG. 15 shows a flowchart of the parts producing process 20.
Figure 16:
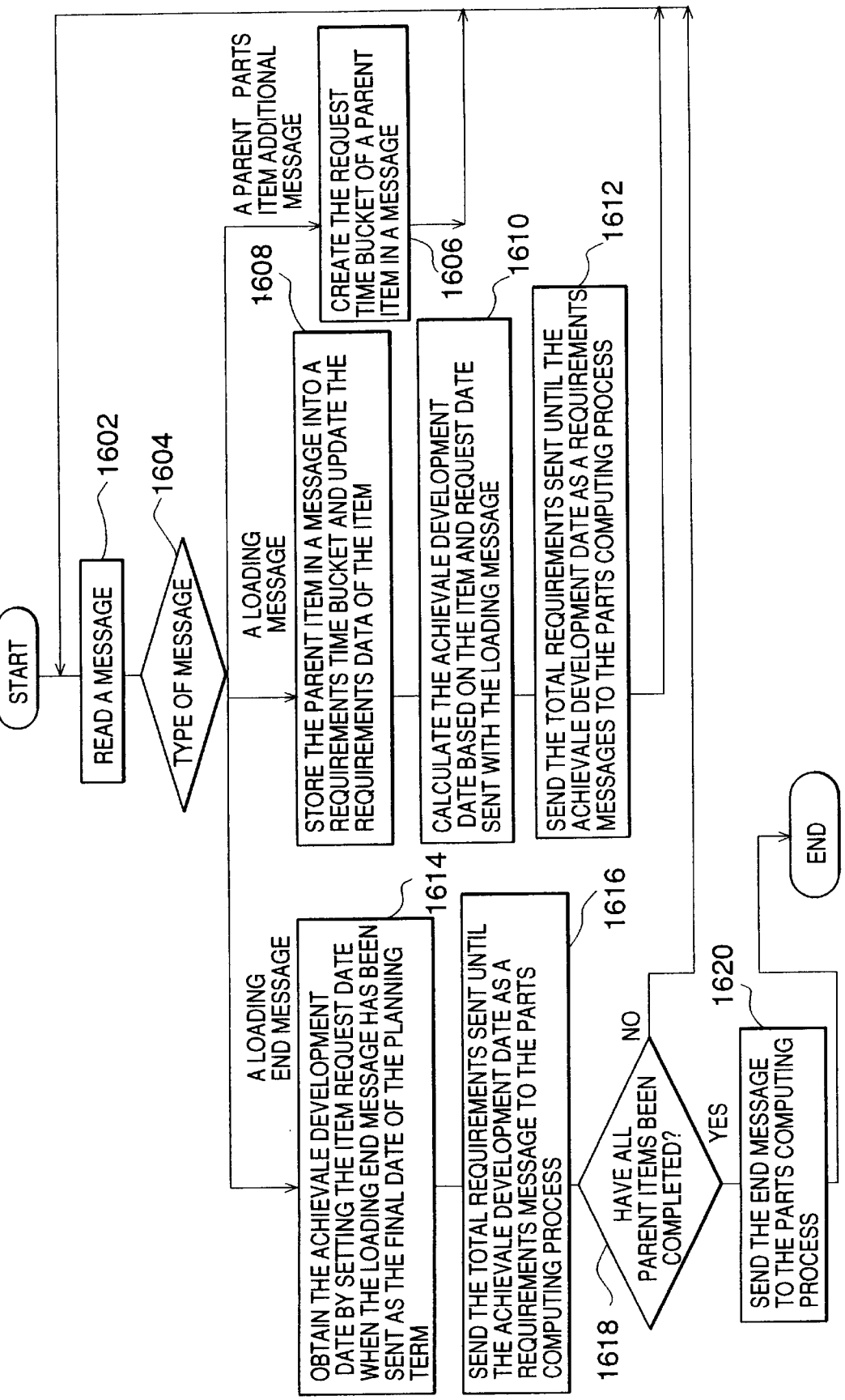
FIG. 16 shows a flowchart of the parts loading accepting process 18.
Figure 17:
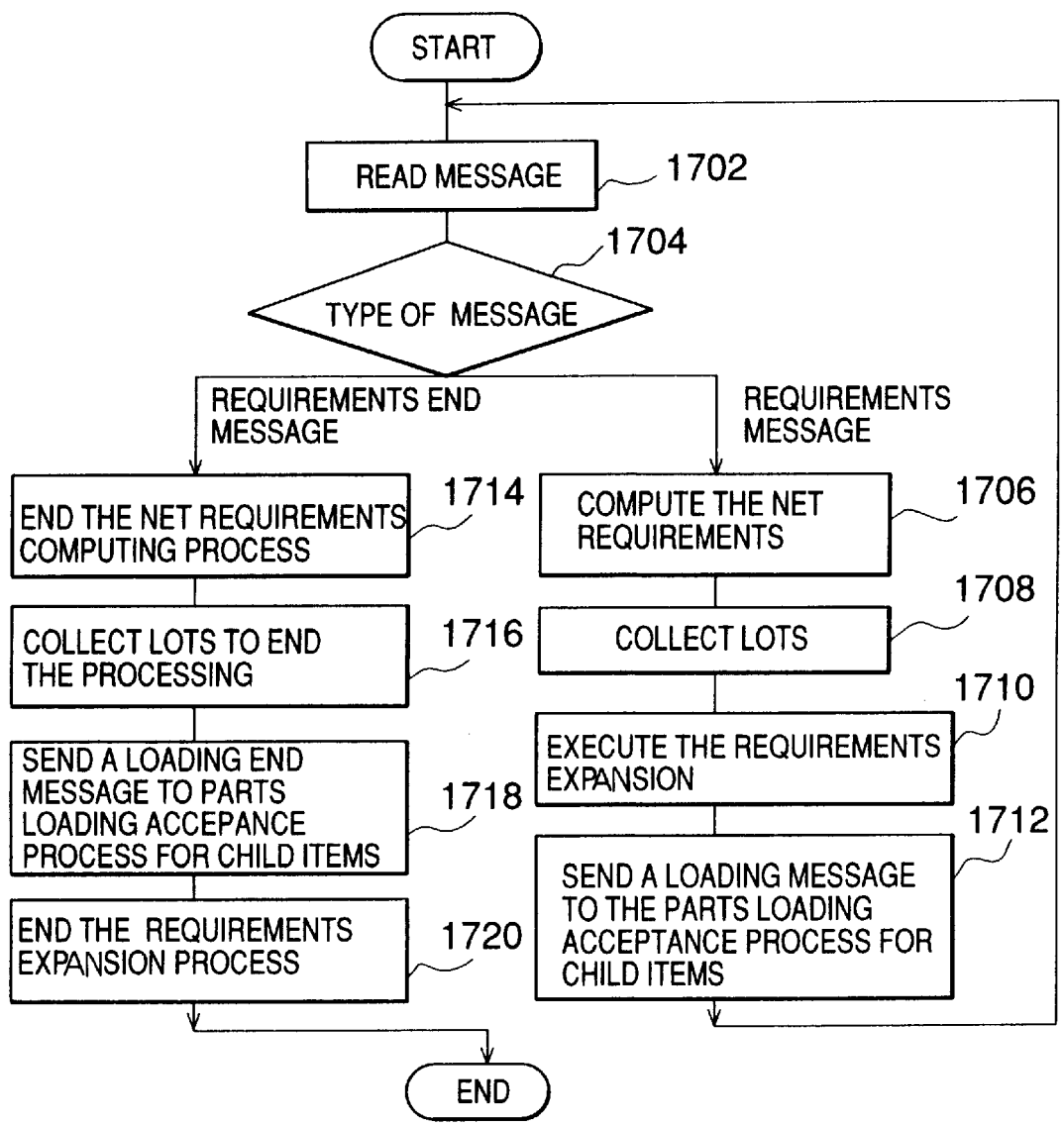
FIG. 17 is shows a flowchart of the parts computing process 17.

FIGS. 12 to 17 show the operation in each process, respectively. FIG. 12 is a flowchart showing the operation in the PE to PE monitoring process 22. FIG. 13 is a flowchart showing the operation in the PE monitoring process 24. FIG. 14 is a flowchart showing the operation in the MPS reading process 15. FIG. 15 is a flowchart showing the operation in the parts producing process 20. FIG. 16 is a flowchart showing the operation in the parts loading acceptance process 18. FIG. 17 is a flowchart showing the operation in the parts computing process 17. Each of these flowcharts shows how each process advances when a specific message is received. The processes cooperate to exchange messages between one another. Hence, explanation will be given, if necessary, by appropriately referring to the flowcharts.

The MRP computation can be roughly divided in two. The first process is a process which produces a network between parts processes, like the parts configuration of an item. Hereinafter, this process is called a "network producing process". The second process is a process which performs an expansion computation in each parts computing unit, using a produced network. Since information on the requirements is computed via the network, the second process is hereinafter called a "data flow expansion process".

The network producing process is a pre-process of the data flow expansion process. With almost no change in the type of product decided in MPS, the network producing process is previously executed once, because the parts configuration of all items do not change. The MRP computation is executed each time only in the data flow developing process. When the type of product determined in MPS depends on each MRP computation, the number of parent items of an item may be varied. Thus the parts configuration of all items may be varied every time. In such a case, it is necessary to execute the network producing process before the data flow developing computation. The following process flow is applicable to that case. However, as has already been described, it is easy to divide the network producing process.

The network producing process (I) and the data flow developing process (II) will be explained in detail below.

(I) the network producing process and (II) the data flow developing process will be explained in detail below.

(I) network producing process

Each process is formed so as to read the content of a received message and then executes a process according to the type (refer to the steps 1202 and 1204 in FIG. 12, the steps 1302 and 1304 in FIG. 13, the steps 1402 and 1404 in FIG. 14, the steps 1502 and 1504 in FIG. 15, the steps 1602 and 1604 in FIG. 16, and the steps 1702 and 1704 in FIG. 17). After executing a process according to a message, each process (not shown) returns to the steps 1202, 1302, 1402, 1502, 1602, and 1702, and then waits for the next message.

In response to a start message from an operator or another device, the PE to PE monitoring process 22 starts the network producing process. First, the PE to PE monitoring process 22 sends a MPS create start message, "create_mps_parts", to each MPS reading process 15 (step 1206 in FIG. 12). Each message is sent to a destination via the PE to PE mail process 23 and the PE mail process 25.

When receiving the MPS create start message, the MPS reading process 15 sends a MPS start message, "create_mps_started (the number of products in MPS to be read)", to the PE to PE monitoring process 22 (step 1406 in FIG. 14). After the transmission of the MPS start message, the name of each product in MPS is read in from the database 21 (step 1410). Then, the MPS reading process 15 sends a create message, "create (mps, product name)", to the parts producing process 20 which performs an expansion computation of the product (step 1412). The first argument of the message represents a message originating source. In this case, the originating source is the MPS reading process 15, that is, "mps". The second argument thereof represents the item name of a parts process to be created. When the create message has been transmitted, the MPS reading process 15 sends a create end message, "create_mps_finished (product name)" to the PE to PE monitoring process 22 (step 1414). The messages are sent repeatedly corresponding to the number of products. Referring to FIG. 14, it is confirmed whether there is a MPS which has not yet issued the create message in the step 1408. The process in the steps 1408 to 1414 is repeated while such an MPS exists. If there is no MSP which has not yet issued the create message in the step 1408, the MPS reading process 15 returns to the step 1402 and then waits for the next message.

In response to the create message ("create (parent item name, item name)") sent from the MPS reading process 15, the parts producing process 20 of the expansion computing process 19 judges whether the parts process of the item already exists (step 1506).

When the decision results in no existence of the parts process 16 of the item, the flow goes to the steps 1508 and 1510. Then, the parts process 16 of the item is created. The created parts process 16 is formed of two processes: the parts computing process 17 and the parts loading acceptance process 18, as already described. First, the parts loading acceptance process 18 is created and then the parts computing process 17 is produced. During this time, the requirements time bucket of a parent item in a message is held in the parts loading acceptance process 18. When the parts computing process 17 is created, the parts producing process 20 reads the parts table data from the database 21 via the database management system and then obtains information regarding a lead time, a low level code, a child item name, the number of items, or the like, necessary for the expansion computation. The information is held in the parts computing process 17. When the information obtained includes a child item, the parts producing process 20 sends a create message, "create (its own item name, child item)", to the parts producing process 20 creating the parts process 16 for the child item (step 1512).

When the parts process 16 of the item has been already produced in the step 1506, a parent item additional message, "add_parent (a parent item name in a create message)", is sent to the parts loading acceptance process 18 included in the parts process 16 (step 1514). In response to the message, the parts loading acceptance process 18 creates the requirements time bucket of a parent item in the message (step 1606 in FIG. 16).

As described above, sending the MPS create start message to the MPS reading process 15 causes a chain of create messages between the parts producing processes 20. The parts process 16 created with the chain allows identification of its parent item name and child item name. Thus the network is created between the parts processes 16.

There are a number of methods of judging the end of the network producing process thus started. Four kinds of judging method (end judging methods 1, 2, 3 and 4) will be described below.

End judging method 1

This end judging method is the simplest judging method. In the system according to the present embodiment, the parts producing process 20 immediately performs the creation of the parts process 16 or additional process of a parent item name in response to the create message. The simplest judging method is changed to the method of controlling the process of the parts producing process 20 level by level using low level codes, like the conventional MRP developing computation. Thus, it is possible to recognize that all networks are produced between the parts processes 16 at the time the lowest level has been developed level by level. However, in order to use the above-mentioned method, the synchronous mechanism process which controls low level codes is needed.

End judging method 2

The item with no child item does not issue a new create message and lies on the farthest end in the parts configuration. When the parts process 16 itself of the item positioned on the farthest end is produced, a creation completion message is immediately sent to the parent item parts process 16. When the parts process 16 of each item receives creation completion messages from all the parts processes 16 of its child items, the creation completion message is sent to the parts process 16 of the parent item. Now, it is assumed that when a parent item additional message is received after sending the creation completion message to the parts process 16 of the parent item, the flow immediately returns to send the creation completion message to the parts process 16 of the parent item. Thus, it is recognized that all networks are produced between the parts processes 16 at the time the parts processes 16 of all products read in MPS have received the creation completion message.

End judging method 3

This method is a method of judging that all networks have been produced between parts processes 16 by confirming that all messages generated in a chain mode have disappeared, or that no create messages have occurred, with particular means.

The short-circuit method can be used as a method of confirming that all messages generated in a chain mode have been disappeared. When the create message with a variable for the short-circuit is sent as a new create message to a child item, a new variable is added to it. Basically, by standardizing the variables on the items with no child items, the variables in the first level make uniformed. Hence, it is possible to judge that the messages have been disappeared at that time (when the variable in the first level made uniformed). However, in the chain of the create messages, it is necessary to standardize the variables of create messages to items with plural parent items of which the parts process has been already created, in addition to standardizing the variable of a create message sent to an item with no child item.

The short-circuit method is disclosed, for example, in the reference book entitled, "KL1 Programming Introduction Volume/Beginners Volume/Intermediate Volume", by Kazuo Taki, ICOT TM-0897, 1990, p. 67.

End judging method 4

Like the end judging method 3, this is a method of detecting that all networks between parts processes have been created, by confirming that no create message has occurred using a particular means. However, unlike the end judging method 3, the message status monitoring method is used in the case where messages are relayed, as the method of confirming that a chain of messages have disappeared.

In the present embodiment, the judging method 4 will be assumed in the explained below. However, there is no problem in using other end judging methods. In the judging methods (here, the end judging methods 2–4) other than the end judging method 1 using low level codes, the low level codes are not used at all even in the network producing process and the data flow developing process. Conventionally, considerable time is spent computing the low level code of each item, based on the parent-to-child relationships between an enormous number of items. The judging method using no low level codes has the advantage of omitting such a process.

The end judgment of the net work producing process, using the end judging method –2 used, will be explained below in detail.

As described above, after having received the MSP create start message for each MPS reading process 15, the PE to PE monitoring process 22 begins to receive the MPS start message ("create_mps_started (the number of products in MPS to be read)") from each MPS reading process 15. In response to the MPS start message, the PE to PE monitoring process 22 counts the number of the products in the MSP start message (step 1208 in FIG. 12). Thereafter, the number of messages is counted (step 1210).

Before and after the event, the MPS reading process 15 which has already received the MPS start message begins to receive the create end message ("create_mps_finished (product name)"). The PE to PE monitoring process 22 counts the total number of the messages (step 1212) upon the create end message is received. It is judged whether the create end messages corresponding to the same number as the total number of products has been reached, and whether MPS start messages have been received from all the MPS reading processes 15 (steps 1214 and 1216). If the conditions in steps 1214 and 1216 are yes, the PE to PE monitoring process 22 judges that the create messages have been transmitted to all the expansion processes 19 of all items positioned on the top stage of the parts configuration network. Thereafter, only the create message or parent item additional message produced by the parts producing process 20 is generated, other than monitoring messages. Hence, the PE to PE monitoring process 22 requests the PE to PE mail process 23 to count the number of mail items to be transferred later (step 1218). The process 22 also transmits a PE to PE monitoring message, "check_outside", to each PE to PE monitoring process 24 (step 1220) before returning to step 1202.

If both conditions in steps 1214 and 1216 are no, or either condition is satisfied, the flow goes to the step 1202 and enters a waiting state.

Each PE monitoring process 24 which has received the PE to PE monitoring message instructs the PE mail process 25 to count the number of mail items to be transferred later (step 1306 in FIG. 13) and transmits the PE monitoring message "check_inside" to the parts producing process 20 via the PE mail process (step 1308).

The parts producing process 20 which has received the PE monitoring message immediately transmits the PE monitoring message to the PE monitoring process 24 via the PE mail process (step 1516 in FIG. 15). When the PE monitoring process 24 receives the returned PE monitoring message, it instructs the PE mail process 25 to cease the counting operation, thus obtaining the count value (step 1310 in FIG. 13). It is judged based on the count value whether the PE mail process 25 has transmitted messages other than the PE monitoring message during the period ranging from the beginning of counting the number of messages to the end thereof (specially, the period of the time from when the previous step 1306 is executed to when the step 1310 is executed (step 1312).

As a result of the judgment, when the count value is 2 (that is, the PE mail process 25 does not transfer a message other than the PE monitoring message), the PE monitoring process 24 transmits a PE to PE monitoring message "check_outside" to the PE to PE monitoring process 22 (step 1314). When the count value is 3 or more (that is, the PE mail process 25 transfers other messages), The PE monitoring process 24 again indicates the PE mail process 25 to count the number of mail items to be transferred later (step 1306). The PE monitoring process 24 also transmits the PE monitoring message ("check_inside") to the parts producing process 20 again (step 1308).

The flow goes back to the step 1302 after the steps 1308 or 1314 and then enters waiting state.

The case where the parts producing process 20 receives the create message preceding the PE monitoring message and the parts process 16 created has a child item in charge of another expansion computing process 19 is listed as the case where the PE monitoring process 24 must transmit the PE monitoring message (the route corresponding to the step 1312→step 1306→step 1308→ . . . ).

In such a case, the parts producing process 20 generates a new create message and then transmits it to the parts producing process 22 in the expansion computing process 19 corresponding to the child item via the PE mail process (steps 1506, 1508, 1510 and 1512 in FIG. 15), and then sends back the PE monitoring message to the PE monitoring process 24 via the PE mail process (refer to step 1516). According to the order, the PE mail process 25 transfers the PE monitoring message after the create message transferring process. Hence, the PE monitoring process 24 is asked for the number of transferred messages, the PE monitoring mail process 25 replies with the number messages increased by the number of transferred messages.

According to such a method, when the PE monitoring process 24 receives no mail items from the PE to PE monitoring process 22 after the reception of the PE to PE monitoring message (the case where the flow goes from the step 1312 to the step 1314), it is recognized that there are no create messages or parent item additional message generated in the PE when the PE monitoring process 24 has sent the PE to PE monitoring message back to the PE to PE monitoring process 22.

In response to the PE to PE monitoring message from each PE monitoring process 24, the PE to PE monitoring process 22 counts the PE to PE monitoring messages (step 1222 in FIG. 12). Then, it is judged whether the count value (that is, the number of PE to PE monitoring messages received) has reached to the same value as that in the PE monitoring process 24, or whether the PE to PE monitoring messages from all the PE monitoring processes 24 have been received (step 1224).

When the messages have not been received from all the PE monitoring processes 24, the flow goes back to the step 1202 and enters a waiting state. On the other hand, when the PE to PE monitoring messages have been received from all the PE monitoring processes 24, the PE to PE monitoring process 22 instructs the PE to PE monitoring process 23 to finish the counting operation and then obtains the count value (step 1226 in FIG. 12). Based on the count value, it is judged whether the PE to PE mail process 23 has transferred messages other than the PE to PE monitoring message during the duration ranging from the beginning of the counting operation to the end thereof (step 1228). When the count value corresponds to the number of the PE monitoring processes 24 (that is, messages except for the PE to PE monitoring message are not transferred), it means that there are no messages exchanged between PEs after the PE to PE monitoring message has been transmitted in step 1220 and there are no messages generated in each PE. That is, it is judged that a network has been created between parts processes 16 because not all messages have been generated. Thereafter, the flow goes to the step 1230. The MPS reading message is transmitted to each MPS reading process 15. Moreover, the end message is transmitted to each PE monitoring process 24 (step 1232) and to the parts producing process 17 in each expansion process 19 (step 1234). Thus, this flow is finished.

On the other hand, in step 1228, when the count value is larger than the number of PE monitoring processes 24 (that is, some messages have transferred), the flow goes to step 1218. Then the PE to PE mail process 23 is instructed to count the number of mail items to be transferred later. The PE to PE monitoring message 23 is transmitted again to each PE monitoring process 24 (step 1220). Thereafter, the same operation is repeated till the count value in the PE to PE mail process reaches 2.

(II) Data flow developing process

The PE to PE monitoring process 22 judges that the network producing process has been finished (that is, NO in step 1228 in FIG. 12), the data flow developing process is started.

First, the PE to PE monitoring process 22 transmits a MPS reading start message "read_mps" to each MPS reading process 15 (step 1230). Moreover, the end message is transmitted to each PE monitoring process 24 and the parts producing process 20 (steps 1232 and 1234). Thereafter, the process itself is finished.

In response to the MPS reading start message, the MPS reading process 15 judges whether an MSP which has not yet read the requirements exists (step 1416). Step 1416 is a process assigned to repeat the processes of steps 1418 to 1422 a number of times corresponding to the number of products to be produced. Hence, when the process is made for the first time, the judgment is certainly to be Yes.

As a result of the judgment, when there is an MPS which has no requirements read, reading of the MPS from the database 21 begins (step 1418). Then the loading message including the requirements of the parts prescribed in MPS is sent to the parts loading acceptance process 18 of the parts process 16 of a product read (step 1420).

The loading message means a message which transmits the requested quantity of a part every predetermined period. The originating source, requested quantity and request date of the loading message are arguments. Specifically, the argument is "set (originating source, request quantity, and request date)". In step 1420, since the originator is MPS, the loading message transmitted in this case is "set (mps, request quantity, request date)". The loading message may be a message in which the content of the whole planning term is sent at a time. The whole term may be divided for every predetermined period to send the content thereof a number of times. In the present embodiment, the loading message is sent in pieces by day, with the minimum unit of a plan defined as one day. The loading message is transmitted in the order passing from the past side to the future side in term of request date. In the present specification, the word "past" or "past side" means merely a direction on time-axis, and does not mean have the general meaning (a period having already elapsed with respect to a present time). The first argument of the loading message represents the originator of the message. In this case, the argument is "mps" because of the requirements from MPS.

After step 1420, the MPS reading process 15 transmits the loading end message "set_finished (mps)" to the parts loading acceptance process 18 of the product (step 1422) at the time when all MPSs in a product have been read. Thereafter, the flow returns to step 1416.

When result of decision for step 1416 is "No", or all the MPSs have read the requirements, the MPS reading process 15 ends its operation.

The requirements time bucket management process 26 of the parts loading acceptance process 18 which has received the loading message (refer to the step 1420 in FIG. 14) stores the requirements included in the message in the requirements time bucket of a parent item name being the message originator, and then updates the requirements data within the database 21 (step 1608).

The requirements included in the loading message sent up to the point in time are stored in the requirements time bucket after being separated by day. However, it is unnecessary to separate the requirements by parent item name to store them. The requirements data updating is a process which rewrites by adding the requirements written by date to the requirements included in the loading message sent up to that point in time. The process is executed by accessing the requirements management process 31 within the database 21 via the database management system.

Figure 11:
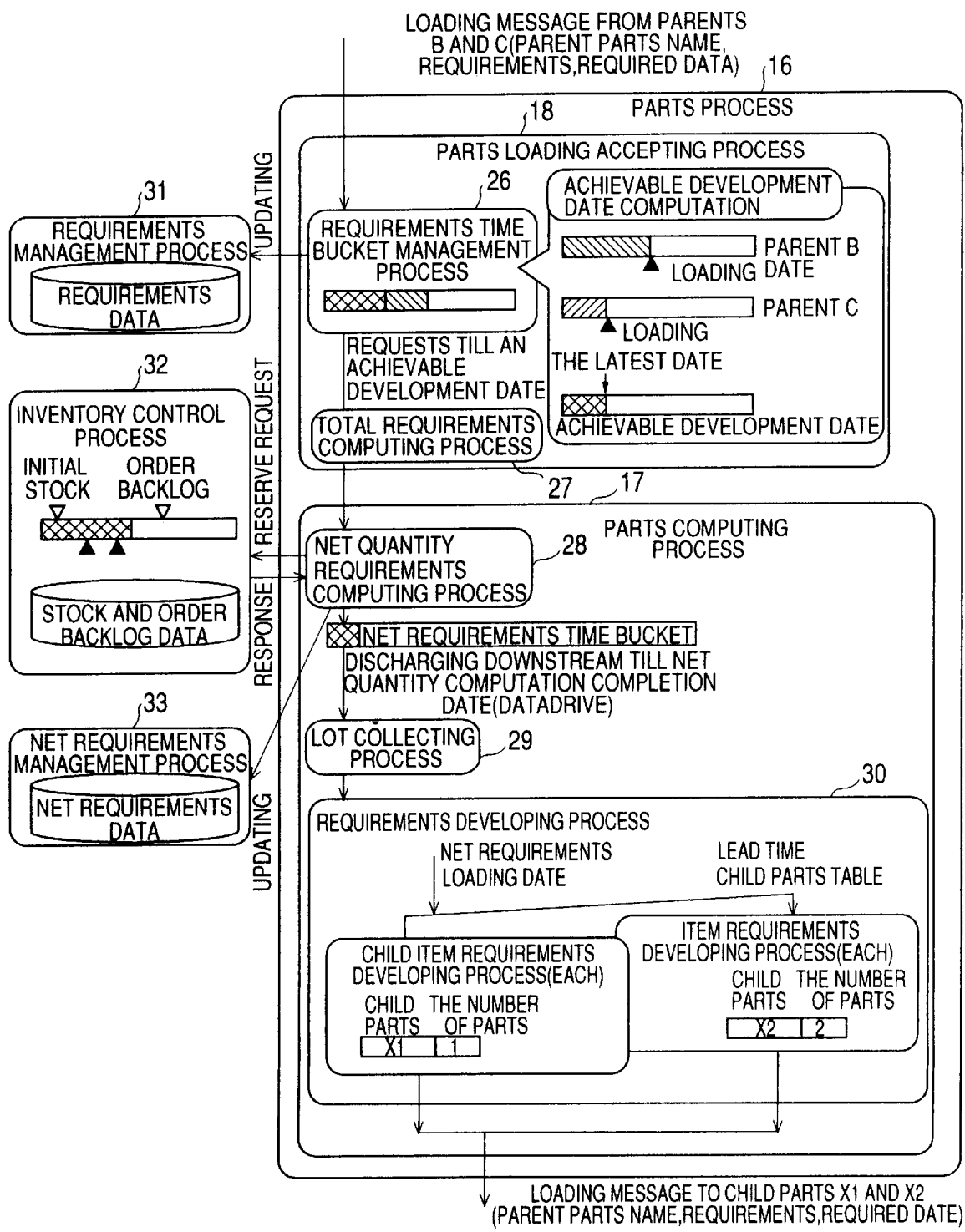
FIG. 11 is a diagram showing the parts process 16.

As illustrated in FIG. 11, the requirements time bucket management process 26 confirms the request date included in the latest loading message sent from the parent item for every parent item. The request date is compared with the loading date confirmed for every parent item and the earliest loading (nearest future's) date is then set as an achievable development date (step 1610). As will be apparent from FIG. 1, the loading message's originator for the items set in MPS is only the MPS reading process 15. With only one parent item, the loading date included in the latest loading message becomes an achievable development date without executing the comparing process.

The requirements at all parent items ranging from the present time to the achievable development date are known. For that reason, the requirements of parts can be decided during the period ranging at least from present time to the achievable development date. Hence, the total requirements computing process 27 sends the requirements for one day as a requirements message to the requirements computing process 17 for the period ranging from the achievable development date to a new achievable development date (step 1612). The requirements for every day can be obtained by referring to the requirements time bucket. The requirements message is transmitted via the parts process 19, not via the PE mail process 25.

When the loading end message "set_finished (parent item name)" is received from all parents (in this case, the MPS reading process 15 (step 1422), the requirements time bucket management process 26 computes the achievable development date by setting the latest request date of the item as the final date of the planning term (step 1614). When the achievable development date is received, the total requirements computing process 27 transmits a requirements message (step 1616).

Thereafter, the requirements time bucket management process 26 judges whether the loading end message received is the final loading end message from all parent items (step 1618).

As a result of the judgment, when parent items which have not transmitted the loading end message remain, the flow returns to step 1602 and then enters a waiting state. On the other hand, when there is a last loading end message, the flow goes to the step 1620.

In the step 1620, the requirements time bucket management process 26 sends the end message to the total requirements computing process 27 and then ceases its operation. In response to the end message, the total requirements computing process 27 transfers the message to the parts computing process 17 and then ceases its operation (step 1620).

Here, the achievable development date has been calculated by day. However, the achievable development date may be calculated by term. For example, the achievable development date may be set only every three days. The day occurring every three days may be set as an achievble development candidate. In this case, the request date which is sent with the latest loading message from the parent item is confirmed for every parent item. Then, a near request date in the near future is selected among request dates confirmed and the candidate achievable development date immediately before request date in the near future may be set as the achievable development date. Particularly, with the achievable development date set as the final date of the planning term, the achievable development date is set to the final date of the planning term when the expansion computation of all parent items of the item has been completely finished. Thus the expansion computation of the item begins.

When the total requirements data from the parts loading acceptance process 18 is received as a requirements message by day in the order passing from the past side to the future side, the parts computing process 17 executes the expansion computation by day in the same time sequence (steps 1706, 1708, and 1710). However, since the total requirements computation has been completed, the expansion computation is made from the net requirements computation. Particularly, when the requirements expansion process is performed in the requirements expansion process 30, the loading message "set (item name, request date, request quantity)" is sent to the parts loading acceptance process 18 of the child item, (step 1712). In this case, the parts process 16 corresponds to the parent of the child item.

When the requirements end message is transmitted from the parts loading acceptance process 18, the processes which each configure the parts computing process 17 sequentially transfer the end message between them, and then finish the transferring (steps 1714 to 1720). Particularly, the expansion process 30 sends a loading end message "set_finished (its item name)" to the parts loading acceptance process 18 of a child item (step 1718) and then finishes its process (step 1720).

The MRP computation is completed when the whole parts process has been finished thus.

As described above, according to the present invention, since the material requirements computation can be executed in parallel, the required time can be reduced remarkably.

According to the above-mentioned embodiment, the parts producing process 20 establishes the creation of the parts process 16 and the connection between the parts processes. However, it may be possible to change only the connection relationship between plural parts processes 16 previously prepared. The parts producing process 20 in which only the connection relationship between plural parts processes 16 previously prepared is changed, corresponds to the "network forming means" defined in the claims section.

Where it is unnecessary to consider the change of the network, a permanent network may be built from the beginning.

The computing result equivalent to the conventional sequential MRP computation can be obtained in a short time by executing the expansion computation of each item in parallel by means of plural parts computing units, and advancing the expansion computation of each item according to the progress status of the computation for the parent item.

In the MRP computation according to the present invention, the process can be made without using any level codes by utilizing the method which uses no low level codes to form the network between parts computing units. Thus, the conventional low level code setting process which takes a long time can be eliminated.

An embodiment according to the present invention will be explained with reference to FIGS. 18 to 25.

Figure 18:
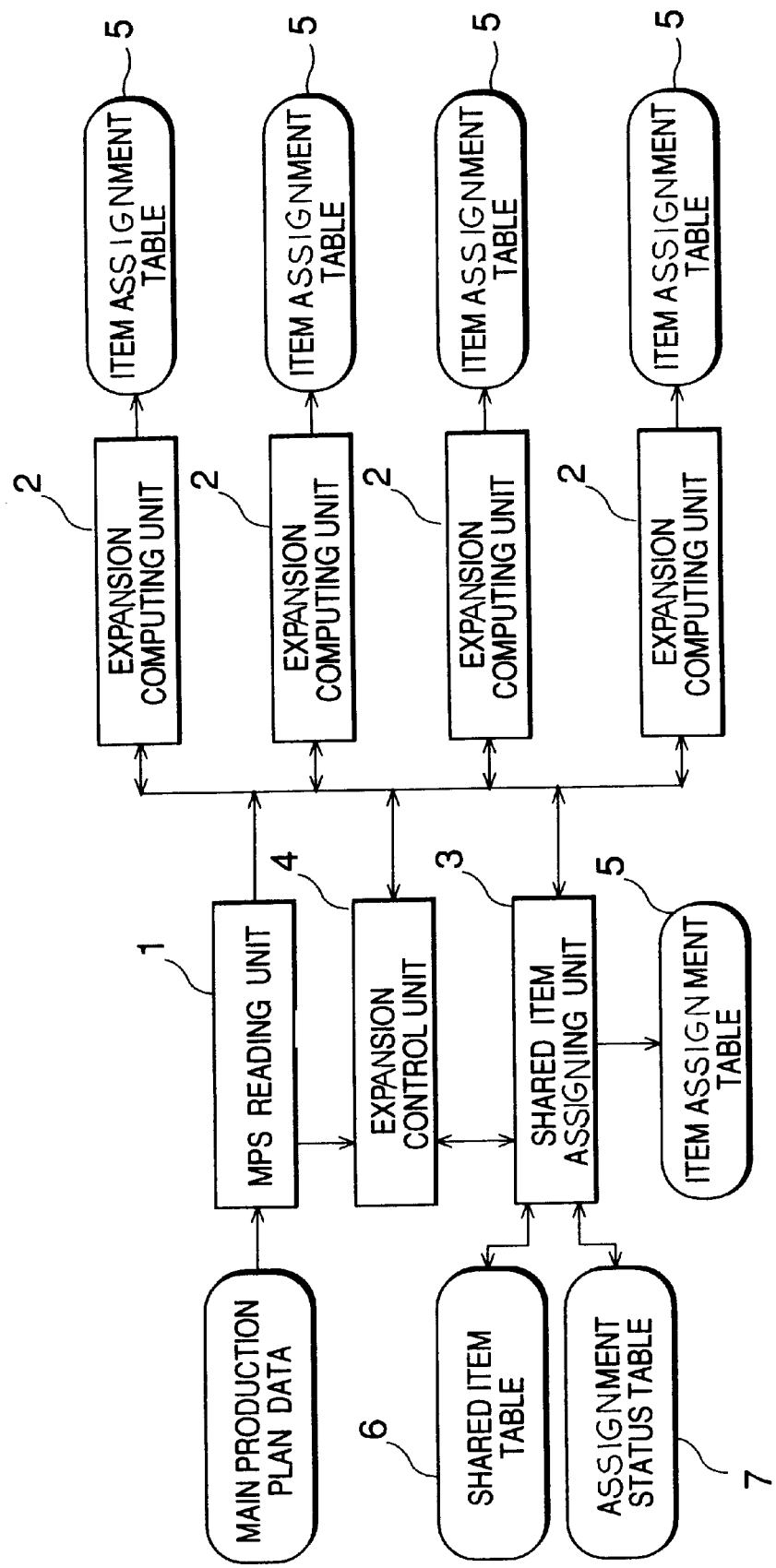
FIG. 18 is a block diagram showing an embodiment according to the present invention.

In this embodiment, the load distributing device, as shown in FIG. 18, consists of one MPS reading unit 1, 4 developing computing units 2, one shared item assignment unit 3, and one developing control unit 4. The material requirements computing device subject to the load distributing device is actually the hardware shown in FIG. 19. This hardware includes 4 loosely-coupled parallel computers and can execute in parallel the decision process of the load distribution of a material requirements computation. Hereinafter, the four PEs (Processing Elements) configuring the parallel computer are called "PE0", "PE1", "PE2", and "PE3", respectively. According to the present embodiment, the load distributing device decides whether data of each item to be computed in the material requirements computation should be assigned to any one of the four PEs (corresponding to the "requirements computing unit" in claims). The most significant feature of the present embodiment is the method of assigning (or attributing) each item to PE0 to PE3. This assigning method directly reflects the content of the parts assignment table 5 (FIG. 20) (to be described later).

The MPS reading unit 1 reads the master production planning data and assigns the item included therein to each expansion computing unit 2. There are various assigning methods. The simplest method is the method of dividing in such a manner that the number of items transmitted to each expansion computing unit 2 is made equal. The master production data may include information on each item corresponding to the total number of child items of the item. In this case, there is the method of dividing in such a manner that the total number of child items assigned to each expansion computing unit 2 is made almost equal in number. Moreover, there is an assigning method using inventory information.

The expansion computing unit 2 executes the expansion computation for items assigned differently. The expansion computation is a process of clarifying the child items constituting an item. The expansion computation is performed by referring to the parts configuration table specifying the parent to child relationship between items. The parts configuration table specifies the parent to child relationships between parts (or items) and is generally used for the material requirements computation. The parts configuration table is previously stored inside each expansion computing unit 2 (or the storage unit accessible to the expansion computer 2).

Figures 19, 20:
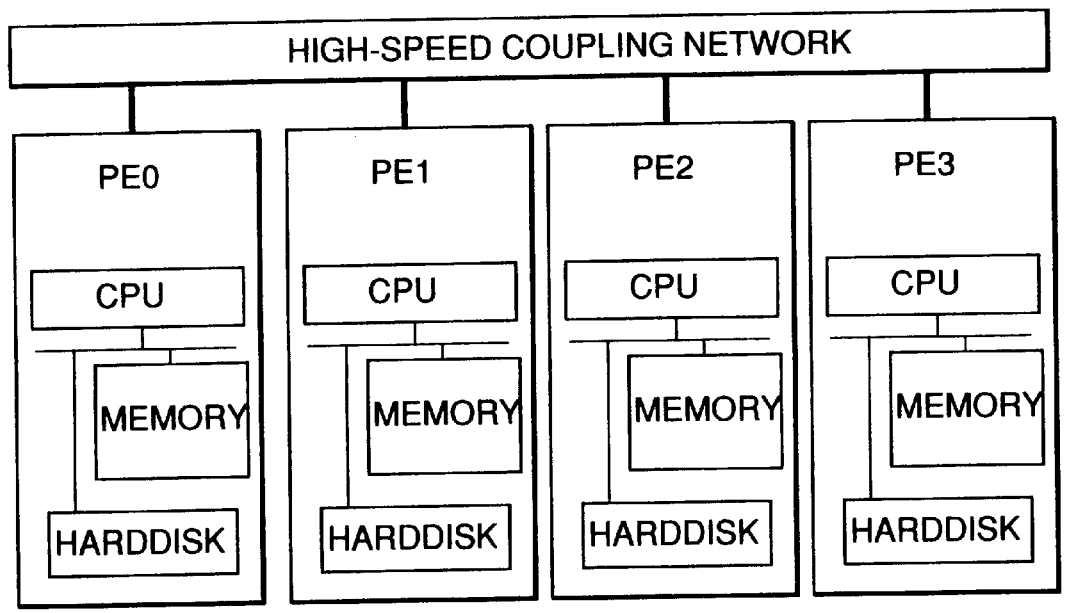
FIG. 19 is a diagram showing a loosely-coupled parallel computer being an example of a concrete hardware configuration.
FIG. 20 is a diagram showing the item assignment table 5.

Each of the expansion computers 2 includes the queue for every level and its own parts assignment table 5 (refer to FIG. 20. The queue for every level is used to execute the child parts expansion computation on a level by level basis. Moreover, each expansion computing unit 2 describes the item to be assigned to the PE (refer to FIG. 19) corresponding to itself in its own item assignment table 5. The expansion computing units 2 correspond to the PEs shown in FIG. 19, respectively. Hence, for the sake of convenience, the expansion computing units 2 are distinguished with "PE0", "PE1", . . . , according to the corresponding relationships.

The expansion computing unit 2 includes a level counter which manages the level of the expansion process in the processing operation (to be described later) and an item counter which manages items.

The expansion control unit 4 synchronizes the process operation of each expansion computing unit 2 and shared item assignment unit 3 to advance level by level for each expansion computing unit 2. Each expansion computing unit 2 simultaneously starts the expansion computation in response to the message from the expansion control unit 4. Upon the completion of the level expansion computation, a message is sent to the expansion control unit 4. Similarly, in response to the message from the expansion control unit 4, the shared item assignment unit 3 starts determining the destination to be assigned to the shared item, and then sends messages to the developing control unit 4 after the process completion. The expansion control unit 4 includes a level counter which manages the level of the expansion process and an expansion computing counter which manages the expansion computing unit.

The shared item assignment unit 3 decides whether items (shared items) shared by plural items are assigned to any one of the expansion computing units 2. The shared item assigning unit 3 includes an item assignment table 5 (FIG. 20), a shared item table 6 (FIG. 23), and an assignment status table 7 (FIG. 24).

Figure 23:
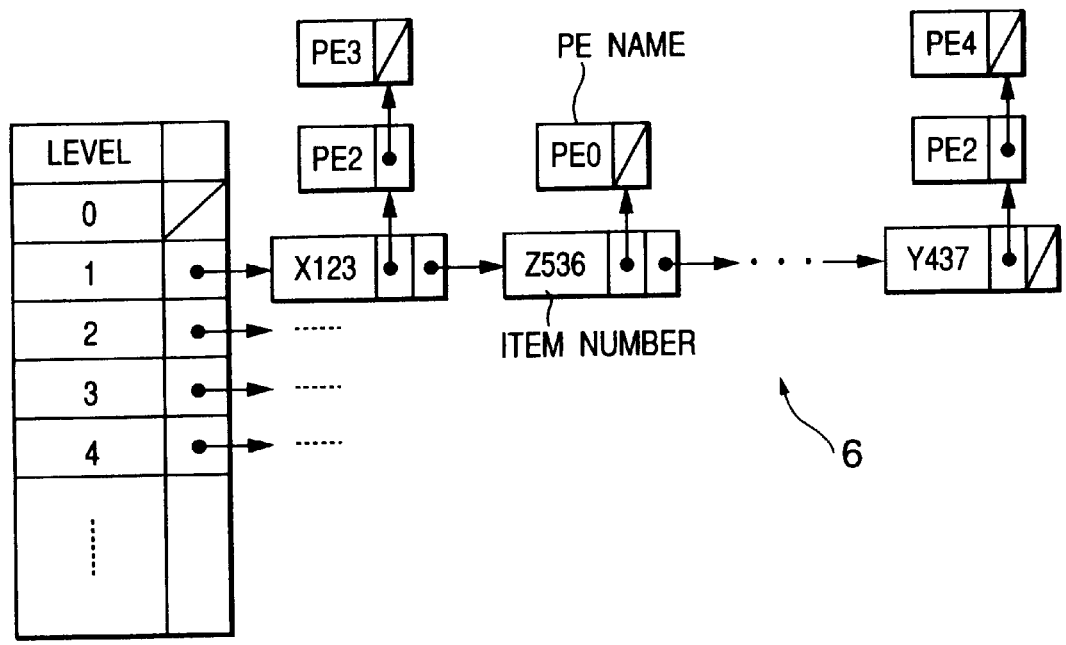
FIG. 23 is a diagram showing the shared item table 6.

The shared item table 6, as shown in FIG. 23, has an assignment where the initial pointer of an item number list with the PE name list is an element. This shared item table 6 can facilitate to specifying types of shared items in a level, or PEs shared by these shared items. The content of the shared item table 6 is not previously prepared, but is appropriately prepared and used during the processing operation (to be described later).

Figure 24:
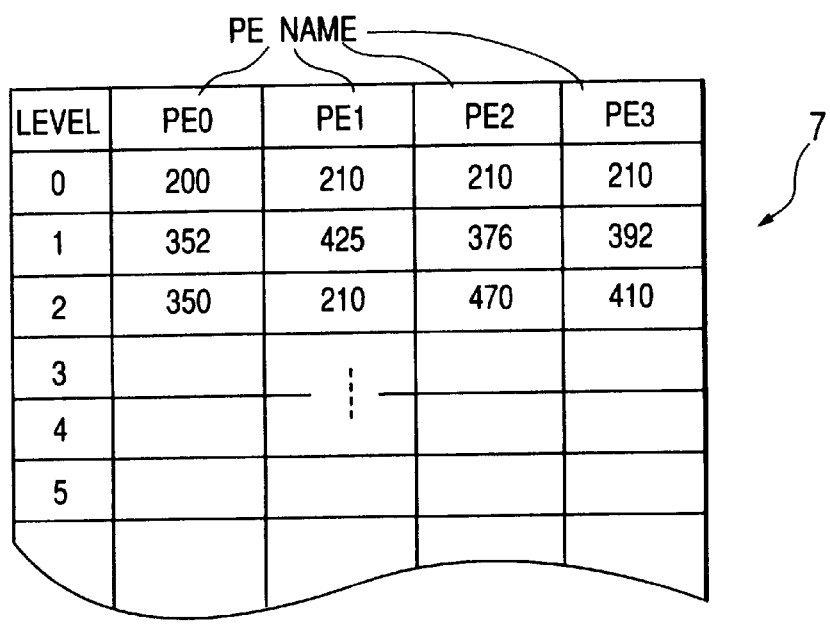
FIG. 24 is a diagram showing the assignment status table 7.

The assignment status table 7, as shown in FIG. 24, shows how many items are assigned in each level of each PE. The content of the assignment status table 7 is not assigned previously. The contents are made by sequentially storing the assignment statuses obtained for every level in the table 7 according to the processing operation to be described later.

The item assignment table 5 (refer to FIG. 20) stores assignment results obtained using the MPS reading unit 1, the expansion control unit 4, and the like. The item assignment table 5 is assigned for every expansion computing unit 2. Only items assigned in the expansion computing unit 2 (that is, the PE (material requirements computing unit) corresponding to the expansion computing unit 2) are described on the item assignment table 5 included in each expansion computing unit 2. On the other hand, the portions of all items being assigned are described on the item assignment table 5 included in the shared item assigning unit 3.

In order to execute the material requirements computation, the item assignment table 5 included in each expansion computing unit 2 is stored in the storage means (memory, hard disk) arranged in each PE shown in FIG. 19 and is used in the following cases. For example, when the database system is independently arranged in each PE, the table is used to confirm which PE the data record of each item exists in the database, during the material requirements computation. With the distribution database system built on a parallel computer and the database management system managing the location of data record of each item, data of each item must be loaded into the memory of each PE to execute the material requirements computation on the memory of each PE. At that time, the table can be used to confirm the PE to be loaded. Moreover, the table can be used as a table which specifies the PE subject to the requirements computation of each item. The object of the present invention is to decide the most suitable location of an item. Hence, as described above, it can be said that the object of the present invention is to obtain an item assignment table 5 in which the most appropriate assignment is described. The "decision of the requirements computing unit assigning each item" defined in the claims section corresponds to "describing each item corresponding to any one of the PEs on the item assignment table 5" in the present embodiment.

The load distributing method and the corresponding device according to the present embodiment can be realized as the parallel processing by means of the parallel computer shown in FIG. 19.

In this specification, the term "level" indicates a hierarchy where the parent to child relationships of items (or parts) are layered, shown in a treelike diagram.

Next, the outline of the operation will be explained below.

Referring to FIG. 18, the MPS reading unit 1 first reads the master production planning data. Item in the master production plan thus read are assigned to each expansion computing unit 2. Each expansion computing unit 2 inputs the assigned item to its item assignment table 5, corresponding to the corresponding PE. Moreover, the expansion computing unit 2 confirms the child item of the assigned item. At this time, confirmation is passed to the level which is one layer than the level of the item assigned by the MPS reading unit 1. As a result, the child items found are described in its item assignment table 5. Where the child items found are ones shared with other items, the information on the corresponding items is sent to the shared item assignment unit 3. The shared item assignment unit 3 determines the expansion computing unit 2 assigning the shared items after information on shared items is received from all the expansion computing units 2. At that time, the expansion computing unit 2 to which the assignment of a shared item is determined describes the shared item on its item assignment table 5 for the first time.

After the assignment of all the items belonging to the corresponding level is decided thus, the child items constituting them (items belonging to the corresponding level) are confirmed. In this case, the confirmation is passed to the lower level which is one layer lower than the corresponding level. The process then advances level by level in the same way. Thus, the assignments of all items can be finally determined The above-mentioned operation will be explained below in more detail with reference to the attached drawings.

In FIG. 18, the MPS reading unit 1 first reads the master production planning data. The MPS reading unit 1 sends the item number and the low level code of each item as a message "set_queue (item number, low level code)" to the assigned developing computing unit 2 to assign items included in the master production plan read to each expansion computing unit 2 (that is, the PE corresponding to the expansion computing unit 2). The MPS reading unit 1 sends the "ready" message to the expansion control unit 4 after the message has been sent to all items included in the master production plan, whereby the operation is ended.

When the MPS reading unit 1 transmits the "ready" message, each expansion computing unit 2 and the shared item assigning unit 3 determine the assignments of all items needed in the material requirements computation. Hereinafter, the operation of each of the expansion computing unit 2, the shared item assigning unit 3, and the expansion control unit 4 will be explained below by referring to FIGS. 21, 22, and 25.

Figure 21:
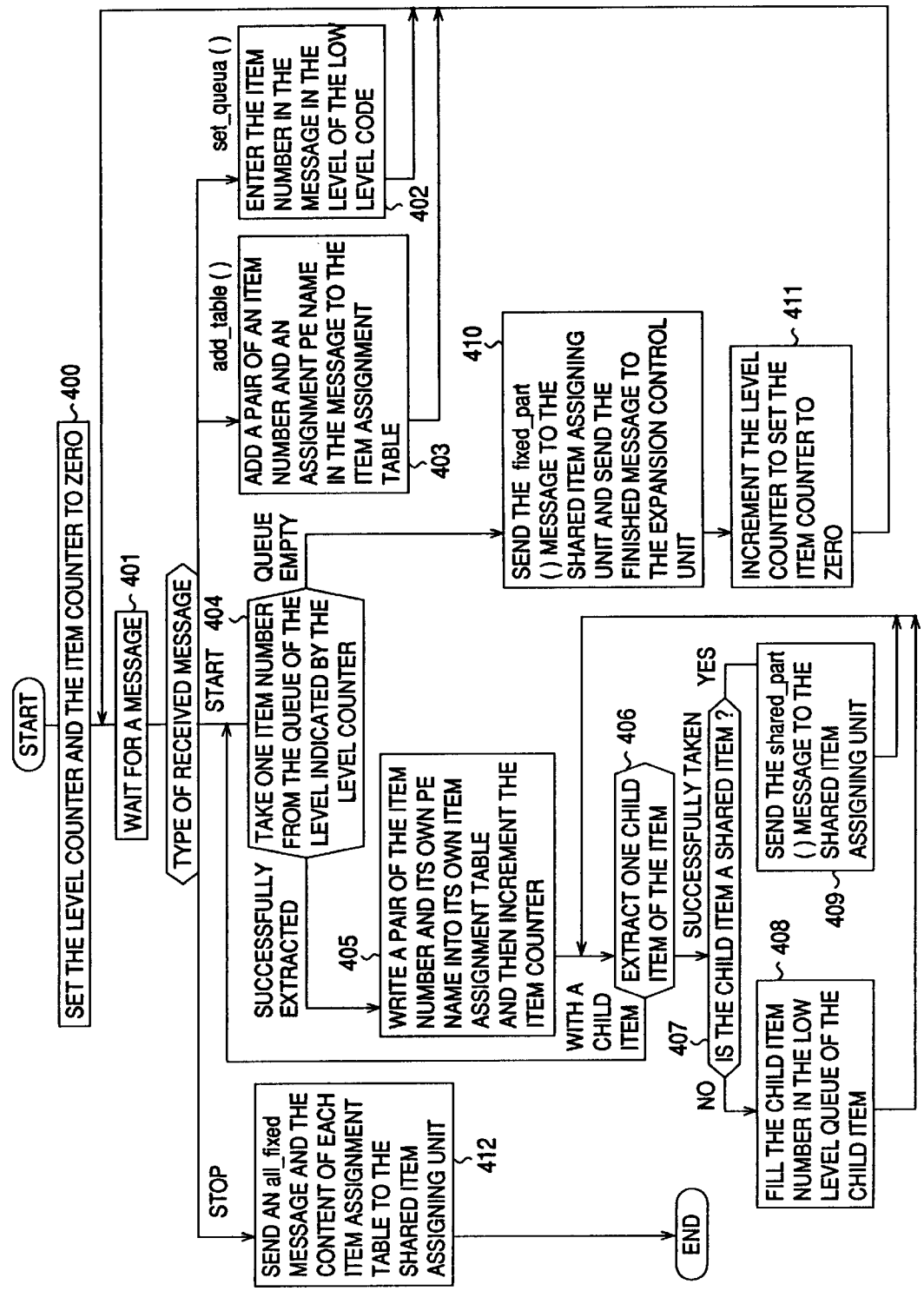
FIG. 21 is a flowchart showing the expansion computing unit 2.
Figure 22:
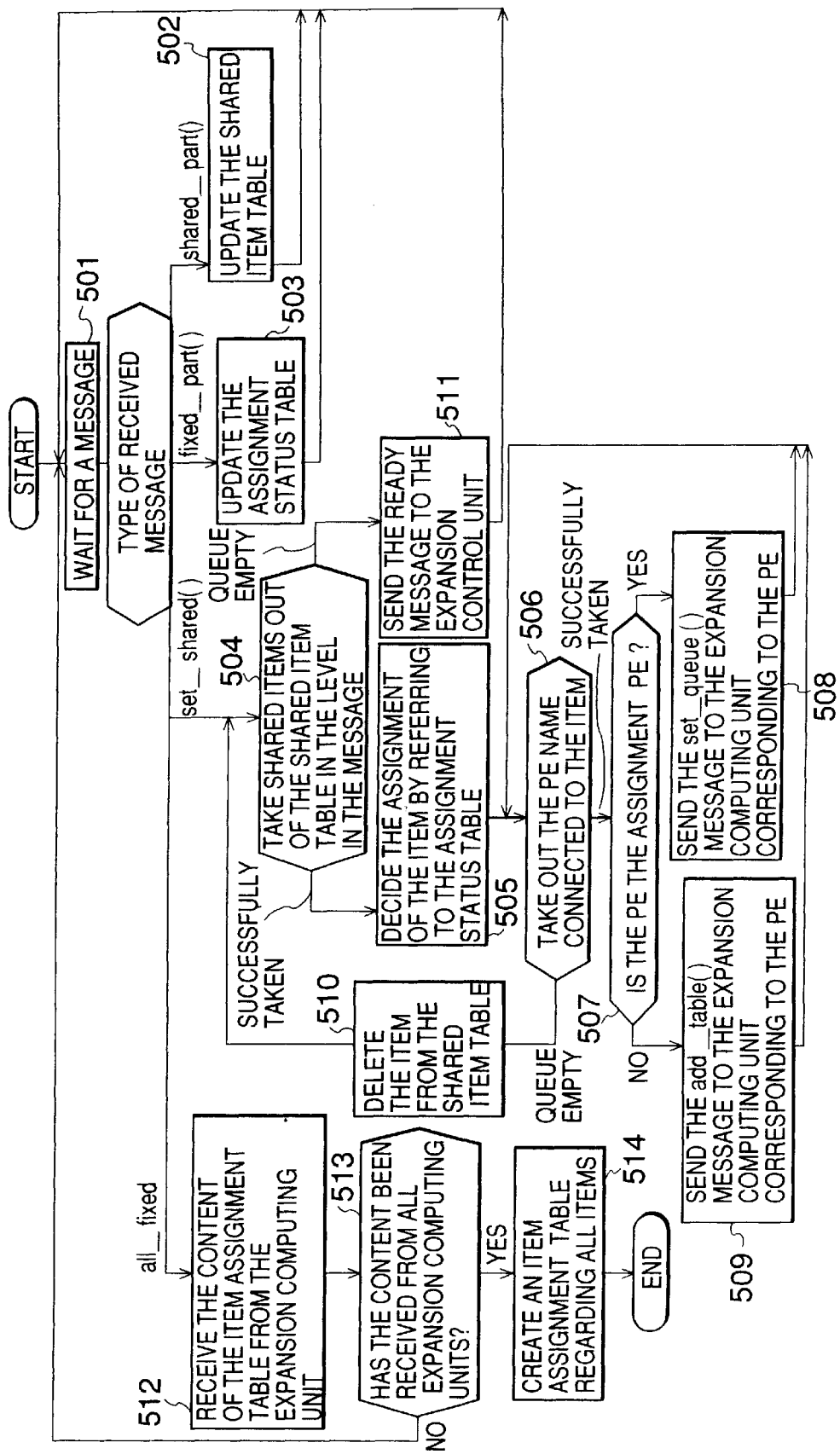
FIG. 22 is a flowchart showing the process of the shared item assigning unit 3.
Figure 25:
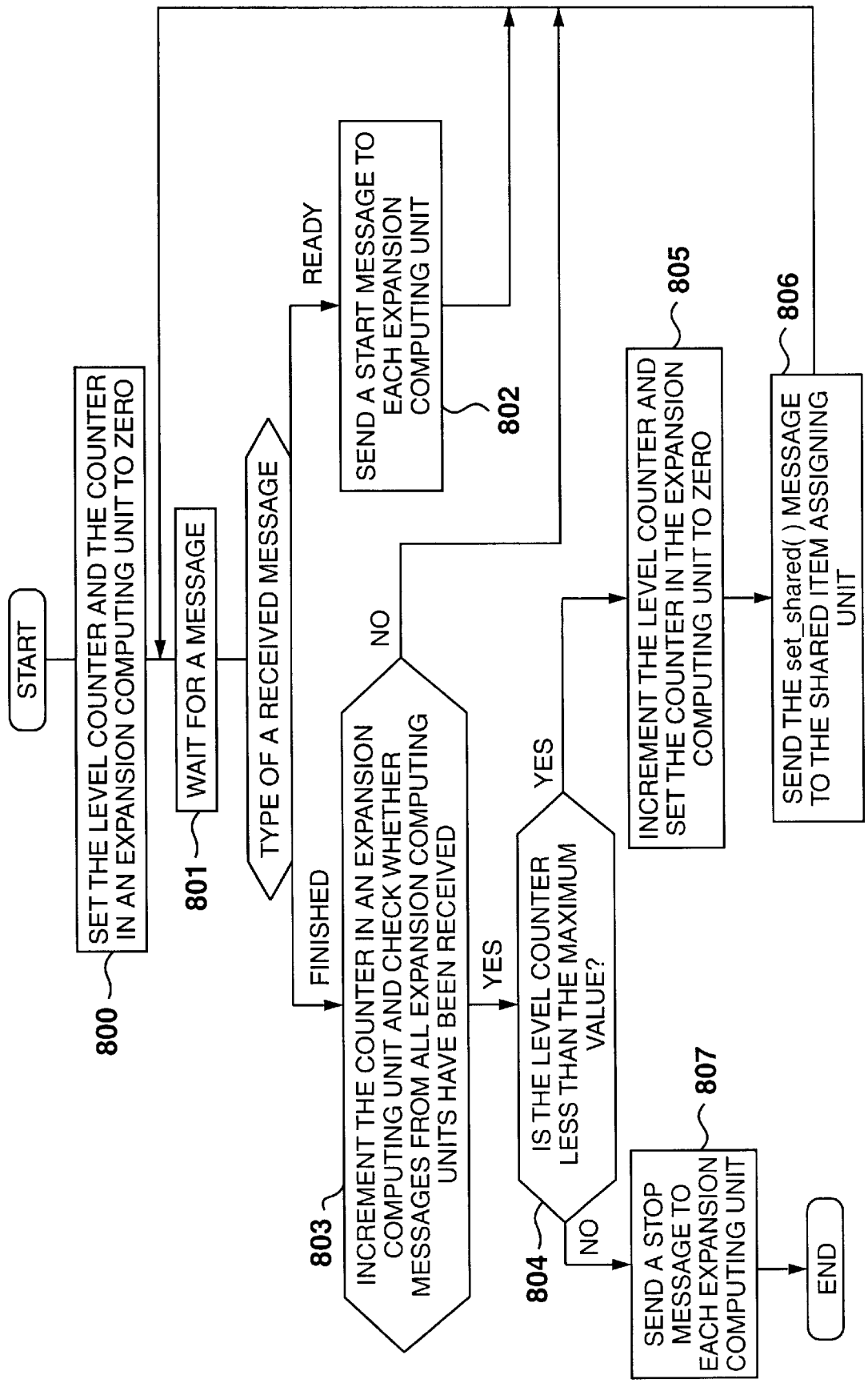
FIG. 25 is a flowchart showing the expansion control unit 4.

FIG. 21 is a flowchart showing the process executed by the expansion computing unit 2. FIG. 22 is a flowchart showing the process executed by the shared item assigning unit 3. FIG. 25 is a flowchart showing the process executed by the expansion control unit 4.

The above-mentioned units operate closely and cooperatively. The explanation given below is made according to an actual procedure of determining an assignment, by referring to the figures.

At the beginning of the process, the expansion control unit 4 and the expansion computing unit 2 set the level counter and the item counter to zero (step 800 in FIG. 25, step 400 in FIG. 22) and then wait for a message without any change (step 801 in FIG. 25, step 401 in FIG. 22). Similarly, the shared item assigning unit 3 waits for a message after the beginning of the operation (step 501 in FIG. 22).

In the waiting state, when receiving the "ready" message from the MPS reading unit 1, the expansion control unit 4 transmits the "start" message to each expansion computing unit 2 (step 802 in FIG. 25). Then, the expansion control unit 4 returns to the step 801 and waits for a message or re-enters a wait state.

When the expansion computing unit 2 receives the "start" message, it extracts one item number from the queue indicated by the level counter (step 404). Then, the expansion computing unit 2 writes the item name and the name of the PE (PE name) corresponding to itself into its item assignment table 5, and increments the item counter (step 405).

Successively, the child item of the item is confirmed by referring to the parts configuration table. At that time, one of the items found is extracted (step 406). It is checked whether the item is a shared item by identifying the item number and low level code of the extracted child item (step 407). Whether the item corresponds to a shared item (or in reverse view, whether the item is in use in plural parent items) can be easily checked by collating the parts configuration table. If the item does not belong to the shared item, the item number is added to the queue in the level indicated by the low level code of the item (step 408). The flow then returns to step 406. The item added to the queue is written into the item assignment table of the expansion computing unit 2 in step 405 to be repeated later.

When it is determined that the item belongs to the shared item in the step 407, the message "shared_part (item number, low level code, its PE name)" is transmitted to the shared item assigning unit 3 (step 409). Then the flow returns to the step 406.

In response to the message "shared_part (item number, low level code, its PE name)", the shared item assigning unit 3 updates the shared item table 6 (refer to FIG. 23) (step 502 in FIG. 22). This updating step is carried out in the following manner. First, in the level column indicating the low level code described to the message (shared_part) on the shared item table 6, it is checked whether the item number assigned to the message (shared_part) has already been written in the shared item table 6. As a result, where the item number assigned to the message has not yet been written, the same is added to the last column of the column assignment. In this case, the PE name assigned to the message is added to the item number. On the other hand, where the item number assigned to the message has already been written into the shared item table 6, it is checked whether the PE name described in the message is included in the PE name described related to the item. As a result, if not included, the PE name described in the message is added as a new element to the item number. After the step 502, the shared item assigning unit 31 returns to the step 501 and re-enters a wait state.

After the step 408 or 409 in FIG. 21, the expansion computing unit 2 which has returned to the step 406 repeats the same process and can store all child items of the item to be processed at that time (except the shared item) into the item assignment table 5. As described above, the shared item is written into the shared item table 6 by sending a message to the shared item assigning unit 3.

If the child item cannot be extracted in step 406 because there is no remaining child item, the expansion computing unit 2 returns to the step 404 and then repeats the same process. Thus, all the items in charge of the expansion computing unit 2 among the item belonging to the level to be processed at that time can be subjected to the above-mentioned child item confirming operation.

Where the item number cannot be extracted in step 404 because the queue is in an empty state (that is, the above-mentioned child items of all the items in charge of the expansion computing unit 2 among the items belonging to the level to be processed at that time have been confirmed), the expansion computing unit 2 sends the message "fixed_ part (item counter, level counter, its PE name)" to the shared item assigning unit 3. The expansion computing unit 2 also sends the message "finished" to the expansion control unit 4 (step 410) Then, the level counter is incremented to alter the level to be processed by one layer while the item counter is set to its initial state (=0) (step 411). The flow goes back to the step 401.

When the message "fixed_part (item counter, level counter, its PE name)" transmitted in step 410 shown in FIG. 21 is received, the shared item assigning unit 3 updates the assignment status table 7 according to the content of the message (step 503 in FIG. 22). This updating operation is carried out as follows: Where the number of items has already been described in the column indicated by the PE name and low level code in the message (fixed_part) of the assignment status table 7, the count value of the item counter described in the message (fixed_part) is added as a new value to the number of items. Thus the new updated value is written into the column.

When the message "finished" transmitted in the step 410 shown in FIG. 21 is received, the expansion control unit 4 checks whether the message "finished" has already been received, by incrementing the counter within the expansion computing unit and confirming the count value of the counter (step 808 in FIG. 25). As a result, if the messages sent from all the expansion computing units 2 have not arrived, the flow returns to step 801 without any operation. If the messages sent from all the expansion computing units 2 have arrived, it is confirmed whether the count value of the level counter is less than the maximum value (step 804). The maximum value can be confirmed by referring to the above-mentioned parts configuration table. If the count value is less than the maximum value (that is, any lower level exists), the level counter is incremented to decrease the level to be processed by one level. The expansion computing counter is initialized (=0) (step 805). Moreover, the flow returns to step 801 by sending the message "set_shared (level counter)" (step 806) to the shared item assigning unit 3.

When receiving the message "set_shared (level counter) ", the shared item assigning unit 3 extracts one of the shared items of the level from the shared item table 6 (step 504 in FIG. 5) and then decides to assign the extracted shared item to the destination thereof (step 505). This assignment is decided as follows. That is, the number of items (item count) assigned in the PE (that is, PE assigned to the parent of the shared item) related to the extracted shared items is confirmed by referring to the assignment status table 7. Thus, it is decided to assign the shared item to the PE including a small number of items. Hereinafter, the PE determination as the assignment destination is called "Assigned PE". In this case, the relative comparison may be made with the number of items (item count) which are assigned at the level indicating the low level code described in the message (set_shared) in the assignment status table 7. Otherwise, the comparison may be made with the sum of the items assigned from the level 0 to the level indicating a low level code. Moreover, the assignment of the following shared item may be determined by taking into account the assignment status of the shared item determined at that time, in addition to the assignment status table 7.

Thereafter, the PE name of the shared item whose the assignment destination has been determined is extracted from the shared item table 6 (step 506). Then it is checked whether the PE name coincides with the assignment PE (step 507). If yes, the message "set_queue (item number, low level code)" is sent to the expansion computing unit 2 (step 508). Then, the flow returns to step 506.

When the message, "set_queue (item number, low level code)", is received, the expansion computing unit 2 places the item number described in the message (set_queue) into the queue of the level indicating the low level code described in the message (step 402 in FIG. 21). Thereafter, the flow returns to step 401. When the expansion computing unit 2 is subjected to the expansion process in the next level (the level by one step lower than the level to be processed at that time), the item additionally written into the queue (shared item) is written in the item assignment table in step 405.

If the PE name does not coincide with the assignment PE in step 507, the shared item assigning unit 3 sends the message "add_table (item name, assignment PE name)" to the expansion computing unit 2 corresponding to the PE (step 509). Then the flow returns to step 506.

When receiving the message "add_table (item name, assignment PE name)", the expansion computing unit 2 adds the content of the message to the item assignment table 5 (step 403 in FIG. 21). Then the flow returns to step 401. Thus, the expansion computing unit 2 can recognize which expansion computing unit has data relating to the shared item.

After step 508 or 509 in FIG. 22, the shared item assigning unit 3 that has returned to step 506 can send the add_table message or set_queue message to all of the developing computing units 2 to which the parent item of the shared item to be processed at that time is assigned, by repeating the same process.

When all PE names have been completely extracted in step 506, the shared item is erased from the shared item table 6 (step 510). Thereafter, the flow returns to step 504. Moreover when all items have been completely removed in step 504, that is, the assignment destinations of all the shared items existing at the level have been completely determined, the message "ready" is sent to the expansion control unit 4. Then the flow returns to step 501 (step 511).

When receiving the message "ready", the expansion control unit 4 again repeats the chain of processes mentioned above in the next level.

When the level counter counts the maximum count value or more in step 804 in FIG. 25, (that is, the level to be processed is the minimum level), the expansion control unit 4 sends the message "stop" to each expansion computing unit 2 (step 807) and then ends its operation.

The expansion computing unit 2 which has received the message "stop" transmits the message "all_fixed" and the content of its item assignment table 5 to the shared item assigning unit 3 (step 412 in FIG. 21) and then ends its operation.

The shared item assigning unit 3 which has received the message "all_fixed" receives the content of the item assignment table 5 transmitted from the expansion computing unit 2 (step 512 in FIG. 22). Then, it is judged whether the contents of the item assignment tables 5 from all the expansion computing units 2 have been received (step 513). As a result of the judgment, when the contents of the item assignment table 5 have been received from the shared item assigning unit 3, the item assignment table 5 regarding all items subject to the material requirements computation is prepared according to the contents (step 514). Then the expansion computing unit 2 ends its operation. As a result of the judgment in step 513, when the contents from all the expansion computing units 2 have not been received, the flow returns to step 501 and enters a wait state.

As described above, the load distributing device according to the present embodiment can distribute the load to reduce the communication traffic in the material requirements computation and equalize the load. Hence, the load distributing device can contribute to the high speed of the material requirements computation.

The configuration of the present embodiment can be suitably modified according to the material requirement computing method. For example, for the case of type configuration in which the parallel material requirements computation is carried out on the on-memory and the requirements computation of the item is carried out with the PE having data, there is no problem if there is no the item assignment table 5, regarding all items, created by the shared item assigning unit in step 514 in FIG. 22. In this case, in the parallel material requirements computation, each PE first loads data needed according to each item assignment table 5 into the its memory. Moreover, data on items designated to be assigned to that PE is read from the master production plan data. Then the expansion computation is carried out level by level. In the expansion computation with the PE, the locations of all items for which data transmission is needed can be checked with each item assignment table 5.

Moreover, in another type of parallel requirements computation, when each PE needs the item assignment table 5 regarding all items, the item assignment table 5 of that PE is discarded and the item assignment table 5 prepared in step 514 in FIG. 22 is copied to each PE. The item assignment tables 5 regarding all items may be prepared in parallel by mutually exchanging the item assignment tables 5 of PEs.

In the present embodiment, it has been explained that the material requirements computation is carried out with a loosely-coupled parallel computer. However, the material requirements computation can be a tightly-coupled parallel computer or plural computers arranged on networks.

In the present embodiment, the material requirements computing device has been explained. However, the present invention can be embodied as a system which operates in the parallel or distributed computer environment equivalent to the material requirements computation.

As described above, according to the present invention, the items in a parent to child relationship in the parts configuration (that is, items for which data are mutually exchanged in the material requirements computation) are generally processed with the same computer. The computer in charge of processing the item shared by plural parents is determined in view of equalizing the load as a whole. For that reason, the communications traffic between computers can be reduced so that the processing time can be reduced.

Since the expansion computing unit can process in parallel in the load distributed computation, the process can be finished in a short time.

As described above, in the material requirements computation, the processing time can be reduced by distributing items processed with the computer, with a constant regularity, or discarding the conventional concept of the low level codes.

What is claimed is:

1. A method of computing material requirements for a product by using a plurality of part computing units, comprising the steps of:

judging a parent-child relationship among a plurality of constituent parts of the product;

assigning said plurality of constituent parts to any of said plurality of computing units so that parts in the parent-child relationship are subjected to a part expansion computation by the same part computing unit, and executing a part expansion computation of said plurality of constituent parts, by using a plurality of constituent parts computing units without giving a low level code to each of said plurality of constituent parts of said product.

2. A method of computing material requirements according to claim 1, further comprising the step of:

executing a part expansion computation of a child part in said plurality of constituent parts, on condition that results of the part expansion computation are obtained with respect to all the constituent parts which are parent to the child part by said plurality of parts computing units.

3. A method of computing material requirements according to claim 2, wherein the part expansion computation of the child part is executed using the part computing unit which computes the parent part.

4. A method of computing material requirements according to claim 1, wherein the part expansion computation of the child part is executed using the part computing unit which computes the parent part.

5. A method of computing material requirements according to claim 1, wherein said plurality of parts computing units are made to be one computing unit.

6. A method of computing material requirements according to claim 1, wherein a roughly equal number of the constituent parts are assigned to said plurality of part computing units, respectively.

7. A material requirements computing system comprising functions of:

judging a parent-child relationship among a plurality of constituent parts of a product;

assigning said plurality of constituent parts to any of a plurality of computing units so that constituent parts in the parent-child relationship are subjected to a part expansion computation executed by the same part computing unit; and executing a part expansion computation of said plurality of constituent parts, by using a plurality of constituent parts computing units without giving a low level code to each of said plurality of constituent parts of said product.

8. A material requirement computing system according to claim 7, comprising:

a part computing unit for executing an expansion computation of a plurality of constituent parts of said product to which no low level code is provided.

9. A material requirements computing system according to claim 7, wherein said plurality of part computing units comprises functions of:

executing a part expansion computation of a child part in said plurality of constituent parts, on condition that results of the part expansion computation are obtained with respect to all the constituent parts which are parent to said child part.

10. A material requirements computing system according to claim 9, wherein a roughly equal number of the constituent parts are assigned to said plurality of part computing units respectively.

11. A method of computing material requirements for a product by executing an expansion computation of a plurality of constituent parts forming said product, said constituent parts being divided up into parent and child constituents, said method comprising the steps of:

assigning a plurality of parts to a plurality of computing units, determining at least one parent-child relationship between at least two parts of said plurality of parts, forming a network of computing units, said network reflecting the relationship between a child part and a related parent part, and executing a part expansion computation of said plurality of constituent parts, by using a plurality of constituent parts computing units without giving a low level code to each of said plurality of constituent parts of said product.

12. A method of computing material requirements according to claim 11, wherein said executing a part expansion computation comprises executing along the at least one parent-child relationship established within the network of said computing units.

13. A method of computing material requirements according to claim 12, wherein said executing a part expansion computation comprises executing with a computing unit assigned to a child part according to the progress of said executing a part expansion computation carried out by a computing unit assigned to a related parent part of said child part.

14. A method of computing material requirements according to claim 13, wherein said executing a part expansion computation is of a child part and the results of the expansion computation are obtained by the plurality of computing units with respect to all the parts which are parent to the child part for which the expansion computation is being executed.

15. A method of computing material requirements according to claim 12, wherein said executing a part expansion computation is of a child part and the results of the expansion computation are obtained by the plurality of computing units with respect to all parts which are parent to the child part for which the expansion computation is being executed.

16. A method of computing material requirements according to claim 11, wherein said executing a part expansion computation comprises executing each computing unit assigned to a child part according to the progress of an expansion computation carried out by a computing unit assigned to a related parent part of said child part.

17. A method of computing material requirements according to claim 16, wherein said executing a part expansion computation is of a child part and the results of the expansion computation are obtained by the plurality of computing units with respect to all parts which are parent to the child part for which the expansion computation is being executed.

18. A method of computing material requirements according to claim 11, wherein said executing a part expansion computation is of a child part and the results of the expansion computation are obtained by the plurality of computing units with respect to all parts which are parent to the child part for which the expansion computation is being executed.

19. A method of computing material requirements according to claim 11, wherein said executing a part expansion computation is of a child part and is executed using the computing unit which computes a related parent part.

20. A method of computing material requirements according to claim 11, further comprising making the plurality of computing units to be one computing unit.

* * * * *